United States Patent [19]
Yaguchi et al.

[11] Patent Number: 5,623,521
[45] Date of Patent: Apr. 22, 1997

[54] DIGITAL GAIN CONTROLLER AND GAIN CONTROL METHOD

[75] Inventors: Tatsuya Yaguchi, Yokohama; Koichi Tanaka, Yamato, both of Japan

[73] Assignee: Canon Kabushiki Kaisha, Tokyo, Japan

[21] Appl. No.: 941,522

[22] Filed: Sep. 8, 1992

[30]      Foreign Application Priority Data

Sep. 11, 1991   [JP]   Japan ................................. 3-231510

[51] Int. Cl.$^6$ ................................................... H04L 27/08
[52] U.S. Cl. .................... 375/345; 375/222; 455/234.2; 455/235.1; 364/715.01; 364/752
[58] Field of Search ........................ 375/98, 345, 222; 455/231.1, 234.1, 234.2, 235.1, 239.1, 240.1, 245.1; 364/724.01, 724.19, 724.2, 715.01, 752, 753; 330/151, 1 R, 1 A

[56]              References Cited

U.S. PATENT DOCUMENTS

| | | | |
|---|---|---|---|
| 4,631,489 | 12/1986 | Laird et al. | 375/98 |
| 4,901,333 | 2/1990 | Hodgkiss | 375/98 |
| 5,016,205 | 5/1991 | Shumway | 375/98 |
| 5,029,162 | 7/1991 | Epps | 375/98 |
| 5,151,874 | 9/1992 | Jeong et al. | 364/752 |
| 5,157,624 | 10/1992 | Hesson | 364/752 |
| 5,161,170 | 11/1992 | Gilbert et al. | 375/98 |

*Primary Examiner*—Stephen Chin
*Assistant Examiner*—Amanda T. Le
*Attorney, Agent, or Firm*—Morgan & Finnegan L.L.P.

[57]                ABSTRACT

A current optimal gain can be calculated directly from an effective value of an input signal by increasing the speed of the initial response without using a feedback loop, in a manner such that a mean power of the input signal and the square-root of the mean power are calculated as an inverse of the effective value, and the input signal is multiplied by the product of this inverse of the number and predetermined effective value.

47 Claims, 13 Drawing Sheets

DIGITAL GAIN CONTROLLER AND GAIN CONTROL METHOD

BACKGROUND OF THE INVENTION

The present invention relates to a digital gain controller and gain control method in a modulator-demodulator (MODEM).

A signal processing section in a conventional MODEM which is standardized by the CCITT recommendation V.29, V.27 ter is generally comprised of a software of digital signal processor (DSP).

In general, a signal level which is inputted into a reception-side MODEM from a communication line differs every time of communication. The signal level needs to be amplified to be a constant level so that precision of a signal processing can be improved by efficiently utilizing the limited dynamic range of the DSP. Otherwise, the data error rate is increased due to the low precision of the signal processing.

Therefore, an automatic gain controller (AGC) adjusting an amplifying gain is internally placed in the MODEM in response to a reception signal level.

In the MODEM V.29, V.27 ter, a training signal sequence is transmitted prior to a data transmission for initializing each signal processor in the reception-side MODEM. The PN segment in this training signal sequence is a signal for initializing an adaptive equalizer. If the PN segment is not correctly demodulated, the initialization cannot be processed. Therefore, a correctly demodulated signal needs to be obtained in a manner such that initializations for the signal processors except for the equalizer are completed prior to the PN segment. For this reason, the AGC gain must be converged before the PN segment. That is, an AGC having quick initial response is required.

However, efficiency of the DSP has been improved recently and the bit length of a signal to be processed and operation speed are both increased. Therefore, the signal processing which was conventionally performed outside of the DSP because of the precision of the signal processing to be obtained and the limitation of operation time to be spent can now be executed inside of the DSP. In the case of the AGC, an analog type AGC circuit has been conventionally arranged outside of the DSP, however, a digital type AGC generally comprises the DSP software at present.

FIG. 13 is a block diagram illustrating the structure of the conventional feedback type digital AGC. The character $\delta$ is a positive constant, $P_0$ is a predetermined power, and $r_0(n)$, $r_0'(n)$, $P_0(n)$, $e_0(n)$, $g_0(n)$ are signal values at each section (which will be described later) at the sampling time n, which respectively represent an input signal, output signal, mean power signal of output, error signal, and gain signal.

In FIG. 13, the gain signal $g_0(n-1)$ which has been decided in one sampling earlier than n and stored in the delay 22 is multiplied by the input signal $r_0(n)$. The output signal $r_0'(n)$ is obtained by:

$$r_0'(n) = g_0(n-1) \cdot r_0(n) \quad (1)$$

Then, this output signal $r_0'(n)$ is squared by the multiplier 27 and averaged by the low pass filter (LPF) 26. The mean power signal $P_0(n)$ is obtained by:

$$P_0(n) = E(r_0'(n)^2) \quad (2)$$

The "E" represents "mean".

Then, an error signal $e_0(n)$ of the above-mentioned mean power signal $P_0(n)$ and the predetermined power $P_0$ is calculated in the power error calculator 25 by:

$$e_0(n) = P_0 - P_0(n) \quad (3)$$

As apparent from the above equation (3), in the case where the mean power of the output signal $r_0'(n)$ is greater than the predetermined power, the error signal $e_0(n)$ becomes negative, while in the case where the mean power is smaller than the predetermined power, it becomes positive. Then, the error signal $e_0(n)$ is multiplied by a constant in the constant multiplier 24, and a cumulative addition is performed by the adder 23 and delay 22.

The gain signal which is stored in the delay 22 is obtained as the following and used as a gain at the sampling time n+1:

$$g_0(n) = g_0(n-1) + \delta \cdot e_0(n) = g_0(n-1) + \delta[P_0 - P_0(n)] \quad (4)$$

As apparent from the equation (4), in the conventional AGC circuit, in the case where the mean power $P_0(n)$ of the output signal is greater than the predetermined power $P_0$, a gain is decreased. While in the case where the mean power $P_0(n)$ is smaller than the predetermined power $P_0$, a gain is increased. That is, in the AGC method, the algorithm which sequentially corrects a gain so that the error $e_0(n)$ of the mean power $P_0(n)$ of the output signal and predetermined power $P_0$ approaches to zero is directed. If a value of the positive constant $\delta$ is appropriately selected, the mean power $P_0(n)$ of the output signal is eventually converged into the predetermined power $P_0$ by repeating this operation.

Since it is apparent from the equation (3) that $e_0(n)=0$, and from the equation (4), $g_0(n)=g_0(n-1)$, the gain is converged into a certain value.

The traceability of the AGC gain has a relation with the positive constant $\delta$. That is, a change of the gain for an operation is obtained from the equation (4) as the following:

$$|g_0(n) - g_0(n-1)| = \delta|e_0(n)| \quad (5)$$

Therefore, if $\delta$ is set to a large value, the change of the gain is increased, and the traceability of the gain is quickened.

As described above, the characteristics that an initial response is as quick as possible and the gain is not fluctuated after the PN segment so that the correctly demodulated signal can be obtained are required for the AGC. Therefore, in general, the speed of the traceability before the PN segment is increased by changing the positive constant $\delta$, and the speed of traceability after the PN segment is decreased.

However, in the aforementioned conventional feedback type digital AGC, if the constant $\delta$ is increased to increase the speed of the traceability, large fluctuation is caused because the gain change becomes susceptible. In the worst case, the gain is diverged. That is, the conventional feedback type digital AGC has the limitation to increase the speed of the initial response since the gain is sequentially corrected.

Therefore, in the case where a signal level is quite large, the drawback is that the convergence of the gain cannot be completed before the PN segment and the adaptive equalizer cannot be initialized correctly.

SUMMARY OF THE INVENTION

Accordingly, it is an object of the present invention to provide a digital gain controller and gain control method which calculates a current optimal gain obtained directly from the effective value of an input signal by increasing an initial response without using a feedback loop.

According to the present invention, the foregoing object is attained by providing a digital gain controller comprising: operation means for calculating the inverse of an effective value of an input signal; first signal generation means for generating a gain signal in a manner such that the inverse of the effective value is multiplied by a predetermined effective value; and second signal generation means for generating an output signal in a manner such that the input signal is multiplied by the gain signal.

It is another object of the present invention to provide a digital gain controller capable of converging a gain before a PN segment regardless of reception signal level.

According to the present invention, the foregoing object is attained by providing a digital gain controller comprising: operation means for calculating a mean amplification of an input signal; first gain controller for generating an amplification signal which is proportional to the input signal having one-fourth of the ratio of the effective value of the input signal to the mean amplification based on the input signal as an effective value; and second gain controller for generating an output signal which is proportional to the amplification signal having an effective value which is equal to the predetermined effective value.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail in accordance with the accompanying drawings.

First Embodiment

Figure 1:
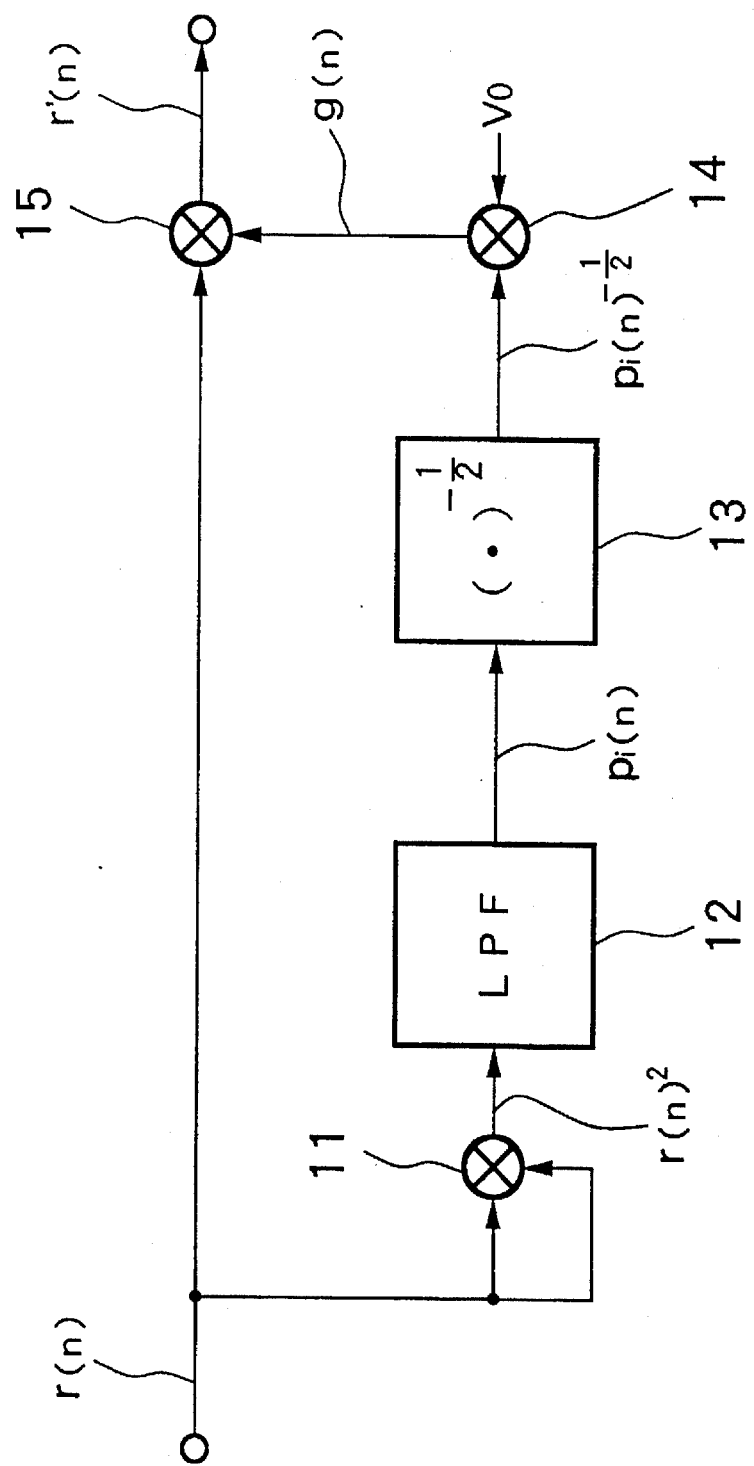
FIG. 1 is a diagram for explaining a signal processing in the digital gain controller according to the first embodiment in the present invention.

FIG. 1 illustrates a signal processing in the digital gain controller (which is referred to as a "controller" thereinafter) according to the first embodiment in the present invention. As shown in the diagram, the present controller is comprised of the multiplier 11, low pass filter (LPF) 12, operation apparatus 13 which calculates the inverse square-root of x for an arbitrary positive number x, constant multiplier 14, and multiplier 15. In the diagram, $V_0$ is a predetermined effective value, and r(n), r'(n), Pi(n), g(n) are signal values in each portion of the controller at the sampling time n, which respectively represent an input signal, output signal, mean power signal of input, and gain signal. Furthermore, the present controller is comprised of the software of the floating point type DSP for the signal processing.

The mean power signal $P_i(n)$ is obtained in a manner such that the input signal r(n) is squared by the multiplier 11 and averaged by the LPF 12. That is:

$$P_i(n) = E(r(n)^2) \tag{6}$$

Then, the mean power signal $P_i(n)$ is inputted into the operation apparatus 13 and $P_i(n)^{-1/2}$ is calculated. The value $P_i(n)^{-1/2}$ which is outputted from the operation apparatus 13 is multiplied by the predetermined effective value $V_0$ in the constant multiplier 14, and the gain signal g(n) is obtained by:

$$\begin{aligned} g(n) &= V_0 P_i(n)^{-1/2} \\ &= V_0 / \sqrt{P_i(n)} \\ &= V_0 / \sqrt{E(r(n)^2)} \end{aligned} \tag{7}$$

The denominator of the above equation (7), the square root of $E(r(n)^2)$, represents an effective value of the input signal r(n).

The output signal r'(n) is obtained in a manner such that the gain signal g(n) is multiplied by the input signal r(n) in the multiplier 15. That is:

$$\begin{aligned} r'(n) &= g(n) \cdot r(n) \\ &= V_0 \cdot r(n) / \sqrt{E(r(n)^2)} \end{aligned} \tag{8}$$

By the equation (8), the effective value of the output signal r'(n) is:

$$\begin{aligned} \sqrt{E(r'(n)^2)} &= \sqrt{E\left(\frac{V_o \cdot r(n)}{\sqrt{E(r(n)^2)}}\right)^2} \\ &= \sqrt{\frac{V_0^2}{E(r(n)^2)} \cdot E(r(n)^2)} \\ &= V_0 \end{aligned} \tag{9}$$

It is apparent from the above equation that the effective value of the output signal is equal to the predetermined effective value $V_0$.

Figure 2A:
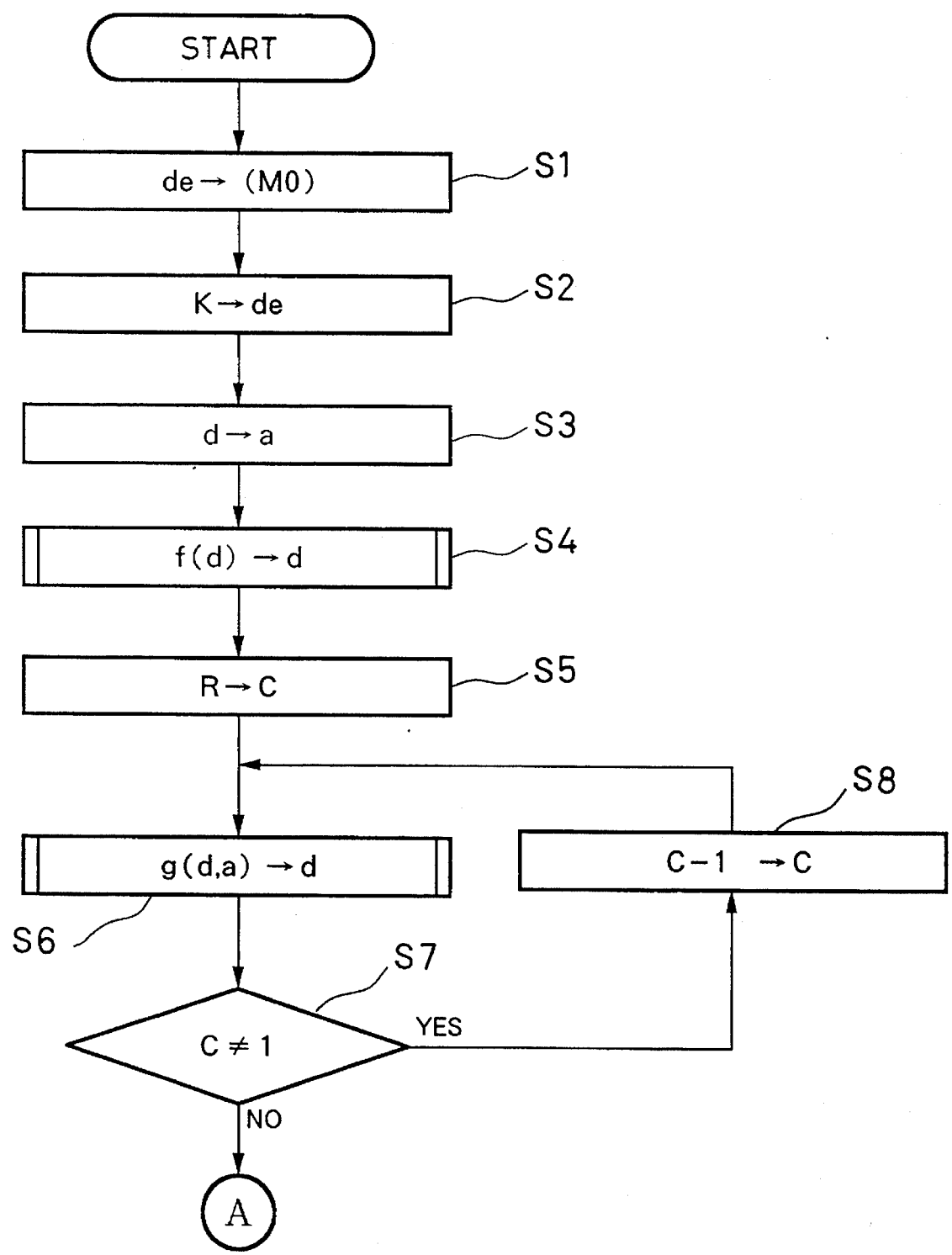
FIGS. 2A–2B is a flowchart illustrating the internal processing in the operation apparatus according to the first embodiment.
Figure 2B:
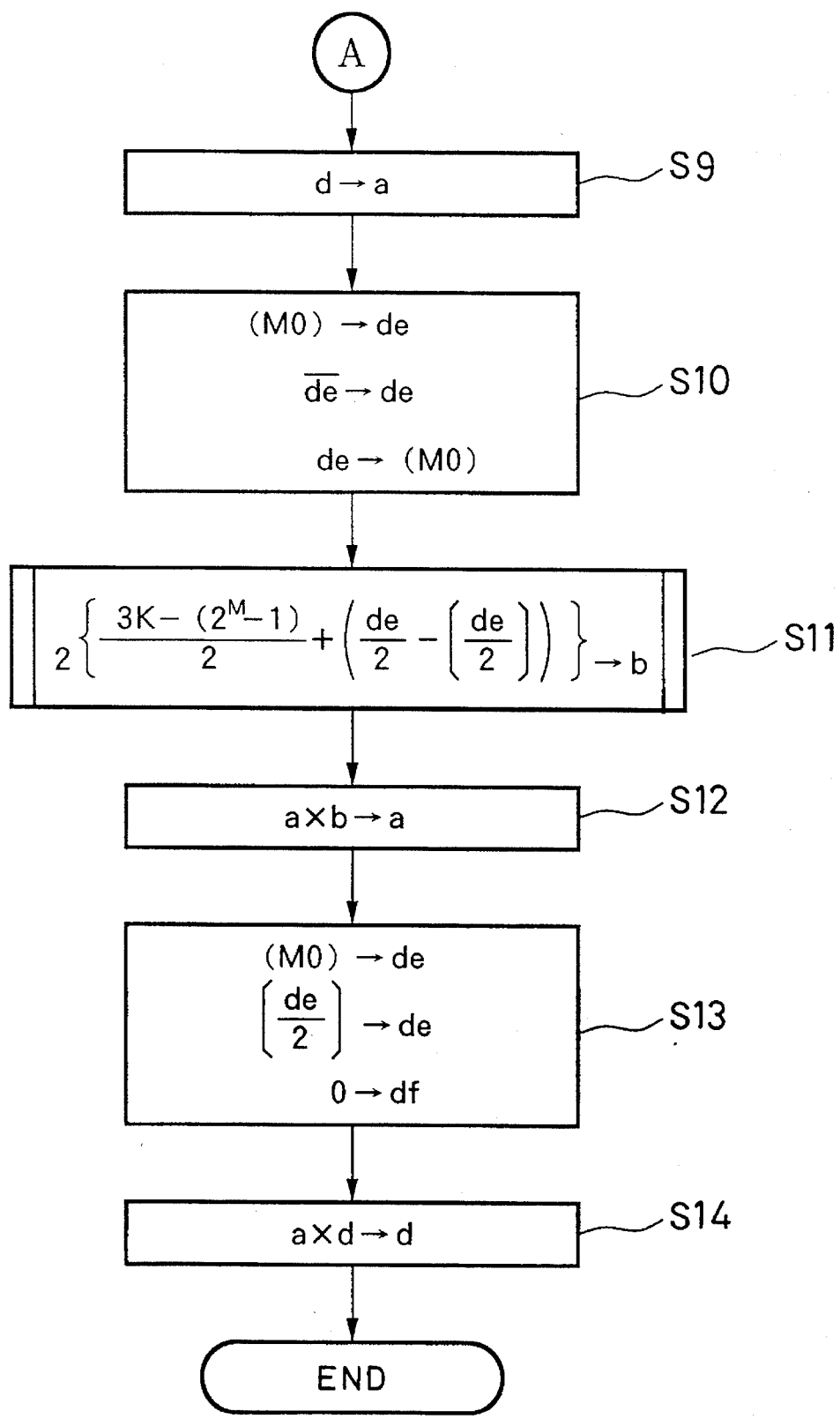
Figure 3:
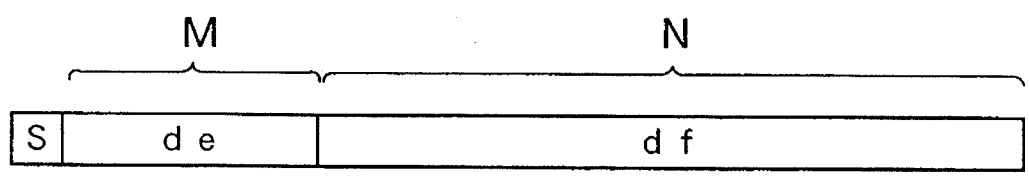
FIG. 3 is a diagram illustrating the structure of the register according to the first embodiment.

Accompanying with the flowcharts in FIGS. 2A and 2B, the internal processing in the operation apparatus 13 according to the present embodiment is described in detail. In the same flowcharts, a, b, c, d, de, and df respectively represent values inputted in the registers a, b, c, d, de, and df. As shown in FIG. 3, the register d is comprised of the sign bit S, M-bit exponent de, and N-bit mantissa df. The register de represents integers $0 \sim (2^M - 1)$ and the register df represents decimals $0 \sim (1 - 2^{-N})$. These registers can be processed as independent registers.

In the DSP used in the controller according to the present embodiment, the following relation is formed:

$$d = (-1)^S \times (1+df) \times 2^{de-K} \tag{10}$$

where K represents a constant integer in $0 \sim (2^M - 1)$. In addition, the structure of the register is similar to that of the register shown in FIG. 3, and the relation indicated in the equation (10) can be also formed on the registers a and b.

First, an input signal to the operation apparatus 13 is inputted into the register d. The value of the input signal at this time is set to as the following:

$$d_0 = (-1)^0 \times (1+df_0) \times 2^{de0}{}_{-K} \tag{11}$$

The principal of the operation apparatus 13 is to multiply the inverse-square root of the mantissa $(1+df_0)$ by the inverse-square root of the exponent $2^{de0}{}_{-K}$. In the procedure of processings which will be described below, steps S2–S9 are the operations for the mantissa and other steps are for the exponent.

In FIG. 2A, in step S1, as a preparation for the operations for the exponent after step S10, de=de$_0$ is saved in the address M0 in the memory. Then, in step S2, the constant integer K is inputted into the register de. If d is determined as $d_2$ at this time, only the mantissa is appeared as the following:

$$d_2 = (1+df_0) \times 2^{K-K} = (1+df_0) \tag{12}$$

For $df_0$ and $d_2$, the following relations are formed:

$$0 \le df_0 \le (1-2^{-N}) \tag{13}$$

$$1 \le d_2 \le (2-2^{-N}) \tag{14}$$

Therefore, the mantissa is $d_2^{-1/2}$, the inverse-square root of $d_2$ which is in the range of 1~2. To obtain $d_2^{-1/2}$, an approximate value of $d_2^{-1/2}$ is calculated by the approximate polynomial. The obtained value is determined as an initial value and converged into a true value by the iterative method.

In step S3, $d=d_2$ is saved in the register a for later processings. In step 4, the approximate value $f(d_2)$ of $d_2^{-1/2}$ is calculated by the following approximate polynomial and the result is inputted into the register d:

$$f(x) \approx x^{-1/2} (1 \le x \le 2) \tag{15}$$

In this process, the value in the register a needs to be kept.

If the value d at the completion of step S4 is determined as $d_4$, the following equation is obtained:

$$d_4 = f(d_2) \approx d_2^{-1/2} \tag{16}$$

From the view of the amount of operation, a desirable approximate polynomial used here is one in which the order is as low as possible having an efficient approximate precision. For this reason, a coefficient of the polynomial f(x) is determined so that f(x) becomes a Chebyshev approximation of $x^{-1/2}$. As more particularly describing, a coefficient of the polynomial f(x) of p-th order is determined so as to minimize the following:

$$\max |f(x) - x^{-1/2}| \tag{17}$$
$$1 \le x \le 2$$

In steps S5–S8, $d_4 \approx d_2^{-1/2}$ is determined as an initial value and a true value of $d_2^{-1/2}$ is calculated by the iterative method. That is, in step S5, a number of occurrence R is inputted into the repeat counter C, and in step S6, the value d is renewed by the two-variable function g(x, y). Again, the value in the register a needs to be kept here.

Furthermore, the function g(x, y) is determined so that the series $\{X_n\}$ which is defined by the following recursion formula (18) is to be as the following equation (19):

$$X_0 \approx \alpha^{-1/2} \tag{18}$$
$$x_{n+1} = g(x_n, \alpha) \; (\alpha > 0, n = 0, 1, 2 \ldots)$$

$$\lim_{n \to \infty} x_n = \alpha^{-1/2} \tag{19}$$

In steps S7 and S8, in the case where the value of the repeat counter C is not 1, decrement is performed and the process returns to step S6. Since when the processing enters to this processing loop, $a=d_2$, $d=d_4 \approx d_2^{-1/2}$, if the value d is repeatedly renewed in step S6 (that is, $g(d, a) \to d$), the value d approaches to $a^{-1/2} = d_2^{-1/2}$.

Since when the processing in step S6 is iterated for R times, the value of the repeat counter C becomes to 1 and the processing gets out of the aforementioned processing loop. The value d at this time is determined as $d_8$.

If the number of occurrence R is selected so that an error $|d_8 - d_2^{-1/2}|$ at the completion of iteration is less than a numeric precision of the DSP, $d_8$ can be regarded as a true value of $d_2^{-1/2}$. Therefore, from the equation (12), the following equation is obtained:

$$d_8 = d_2^{-1/2} = (1+df_0)^{-1/2} \tag{20}$$

In this way, the inverse square-root of the exponent of $d_0$ is obtained.

In step S9 in FIG. 2B, $d=d_8$ is saved in the register a for later processings. In step S10, de=de$_0$ which was saved in the address M0 in step S1 is returned to the register de and the NOT (inverse) operation is performed. This value is again saved in the address M0. At this time, the value of the address M0 is as the following:

$$(M0) = \overline{de_0} = (2^M - 1) - de_0 \tag{21}$$

In step S11, by using de=$\overline{de_0}$, the following is calculated and the result is inputted into the register b:

$$2^{\{\frac{3K-(2M-1)}{2} + (\frac{de}{2} - [\frac{de}{2}])\}}$$

The [X] represents a maximum integer which is less than x. In step S11, the value in the register a needs to be kept. Furthermore, the value b at the completion of the processing in step S11 is:

$$b = 2^{\{\frac{3K-(2^M-1)}{2} +(\frac{\overline{de0}}{2}) -[\frac{\overline{de0}}{2}])\}} \tag{22}$$

In step S12, $a=d_8$ which was saved in step S9 is multiplied by the value b which was calculated in step S11, and the result is inputted into the register a. In this case, from the equations (20) and (22), the following equation is obtained:

$$\begin{aligned} a &= d_8 \cdot b \tag{23} \\ &= (1+df_0)^{-1/2} \times 2^{\{\frac{3K-(2^M-1)}{2} +(\frac{\overline{de0}}{2}) -[\frac{\overline{de0}}{2}])\}} \end{aligned}$$

In step S13, $de=\overline{de_0}$ which has been saved in the address M0 in step S10 is returned to the register de and multiplied by ½. Thus, the integer $[\overline{de_0}/2]$ can be obtained. Furthermore, the register df is cleared.

If the value d at this time is determined as $d_{13}$, the following equation is formed:

$$\begin{aligned} d_{13} &= (1+0) \times 2^{[\overline{de0}/2]-K} \tag{24} \\ &= 2^{[\overline{de0}/2]-K} \end{aligned}$$

In step S14, the value a obtained in step S12 is multiplied by the value d obtained in step S13, and the result is inputted into the register d. If the value d at this time is determined as $d_{14}$, the following equation is obtained from the equations (23) and (24):

$$\begin{aligned} d_{14} &= a \times d_{13} \tag{25} \\ &= (1+df_0)^{-1/2} \times 2^{\{\frac{3K-(2^M-1)}{2} +(\frac{\overline{de0}}{2}) -[\frac{\overline{de0}}{2}])\}} \times 2^{[\overline{de0}/2]-K} \\ &= (1+df_0)^{-1/2} \times 2^{\{\frac{3K-(2^M-1)+\overline{de0}}{2} -K\}} \\ &= (1+df_0)^{-1/2} \times 2^{-\frac{(2^M-1)+\overline{de0}+K}{2}} \\ &= (1+df_0)^{-1/2} \times (2^{\{(2^M-1)-\overline{de0}-K\}})^{-1/2} \end{aligned}$$

If the equation (21) is substituted in the equation (25), the following equation is obtained:

$$d_{14}=(1+df_0)^{-1/2} \times (2^{de0-K})^{-1/2} \tag{26}$$

Thus, the inverse-square root of the exponent is obtained. If the equation (11) is used, the following equation can be obtained:

$$d_{14}=\{(1+df_0)\times 2^{de0}{}_{-K}\}^{-1/2}=d_0^{-1/2} \tag{27}$$

Thus, the value d at the completion of the processing in FIG. 2B is the inverse square-root of d at the beginning of the processing.

In this way, the operation apparatus 13 is comprised of the software of the floating point type DSP.

As described above, an optimum gain can be obtained directly from the effective value of the input signal in the digital gain controller without using the feedback loop in a manner such that the inverse of the effective value of the input signal is calculated, and is multiplied by the predetermined effective value, which is a gain.

In the controller according to the present embodiment, since the initial response is quickened in comparison with that of the feedback type AGC, the gain can be converged before the PN segment regardless of the signal level.

Then, the modified embodiment of the first embodiment is described.

Modification

Figure 4:
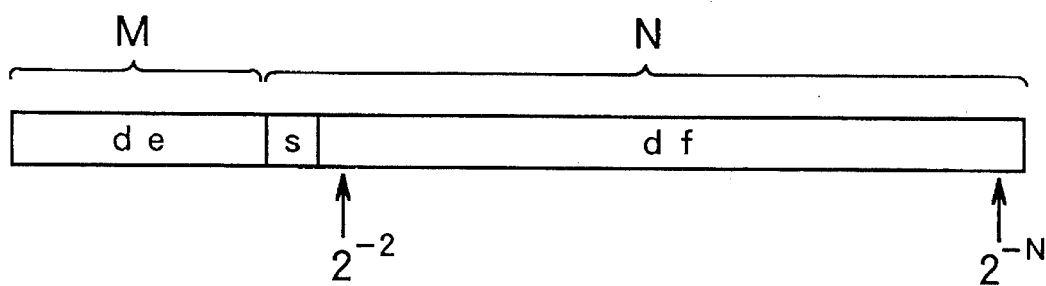
FIG. 4 is a diagram illustrating the structure of the register according to the modified embodiment of the first embodiment.

The structure of the register d of the DSP according to the modified embodiment is shown in FIG. 4. The register d is comprised of the M-bit exponent de and the N-bit mantissa df, and the following relation is formed:

$$d=\{(-1)^S \times \tfrac{1}{2}+df\} \times 2^{de} \tag{10-1}$$

The "S" in the mantissa is a sign bit, and the formats for de and df are both complements of 2. The "de" represents integers in $-2^{M-1} \sim 2^{M-1}-1$, and "df" represents decimals in $-2^{-1} \sim 2^{-1} -2^{-N}$.

Furthermore, the input signal value to the operation apparatus 13 is determined as the following:

$$d_0=(\tfrac{1}{2}+df_0)\times 2^{de0} \quad (d_0 \geq 0) \tag{11-1}$$

The principle of the operation apparatus 13 is that the inverse square-root of the mantissa $(\tfrac{1}{2}+df_0)$ is multiplied by the inverse square-root of the exponent $2^{de0}$.

In the procedure of the processings according to the modified embodiment, when the register de is cleared in the processing in step S2A, the value $d_2$ is as following:

$$d_2=(\tfrac{1}{2}+df_0)\times 2^0=\tfrac{1}{2}+df_0 \tag{12-1}$$

Since the input signal $d_0$ is over 0, the following relations are formed:

$$0 \leq df_0 \geq 2^{-1}-2^{-N} \tag{13-1}$$

$$2^{-1} \leq d_2 \leq 1-2^{-N} \tag{14-1}$$

The mantissa is the inverse square-root of $d_2$ in the range of $2^{-1} \sim 1$.

Therefore, as an approximate polynomial, the following is used:

$$f(x) \approx x^{-1/2} \quad (2^{-1} \leq x \leq 1) \tag{15-1}$$

The approximate value $f(d_2)$ of $d_2^{-1/2}$ is calculated by the above inequalities, and the result is inputted into the register d. The polynomial f(x) is a polynomial of the p-th order to the fixed p having a coefficient such that the following inequalities to be the minimum value:

$$max|f(x) - x^{-1/2}| \tag{17-1}$$

$$2^{-1} \leq x \leq 1$$

By repeating the renewal of the value d in steps S6–S8 in FIG. 2A, the value $d_8$, which is the value d when the processing gets out of the loop is:

$$d_8=d_2^{-1/2}=(\tfrac{1}{2}+df_0)^{-1/2} \tag{20-1}$$

Thus, the inverse square-root of the mantissa of $d_0$ can be obtained.

In the processing corresponding to that of step S11 in FIG. 2B in the modified embodiment, the following can is calculated by using $de=\overline{de_0}$:

$$2^{\{\frac{1}{2}+(de/2-[de/2])\}} \tag{21-2}$$

The result is inputted into the register b. Therefore, the value b at the completion of this processing is:

$$b=2^{\{3/2+(\overline{de0}/2-[\overline{de0}/2])\}} \qquad (22\text{-}1)$$

Furthermore, in step S12, the following equation is obtained from the equations (20-1) and (22-1):

$$\begin{aligned} a &= d_8 \cdot b & (23\text{-}1) \\ &= (1/2+df_0)^{-1/2} \times \\ & \quad 2^{\{3/2+(\overline{de0}/2-[\overline{de0}/2])\}} \end{aligned}$$

In the modified embodiment, the value d, that is, the value $d_{13}$ at the completion of step S13 is:

$$d_{13}=(\tfrac{1}{2}+0)\times 2^{[\overline{de0}/2]}=2^{[\overline{de0}/2]-1} \qquad (24\text{-}1)$$

When the obtained value a is multiplied by $d=d_{13}$, the value d, that is, $d_{14}$ is as the following from the equations (23-1) and (24-1):

$$\begin{aligned} d_{14} &= a\times d_{13} & (25\text{-}1)\\ &= (1/2+df_0)^{-1/2}\times \\ & \quad 2^{\{3/2+(\overline{de0}/2-[\overline{de0}/2])\}}\times \\ & \quad 2^{[\overline{de0}/2]-1} \\ &= (1/2+df_0)^{-1/2}\times (2^{\overline{de0}+1})^{1/2} \end{aligned}$$

Since $\overline{de_0}+1=-de_0$, the value $d_{14}$ is obtained as following:

$$d_{14}=(\tfrac{1}{2}+df_0)^{-\tfrac{1}{2}}\times(2^{de0})^{-\tfrac{1}{2}} \qquad (26\text{-}1)$$

In this way, the inverse square-root of the exponent can be obtained. Furthermore, from the equation (11-1), the following equation is obtained:

$$d_{14}=\{(\tfrac{1}{2}+df_0)\times 2^{de0}\}^{-\tfrac{1}{2}}=d_0^{-\tfrac{1}{2}} \qquad (27\text{-}1)$$

Therefore, the value d after the completion of the processing is the inverse square-root of d which is at the beginning of the processing.

Second Embodiment

The second embodiment according to the present invention is described below.

Figure 5:
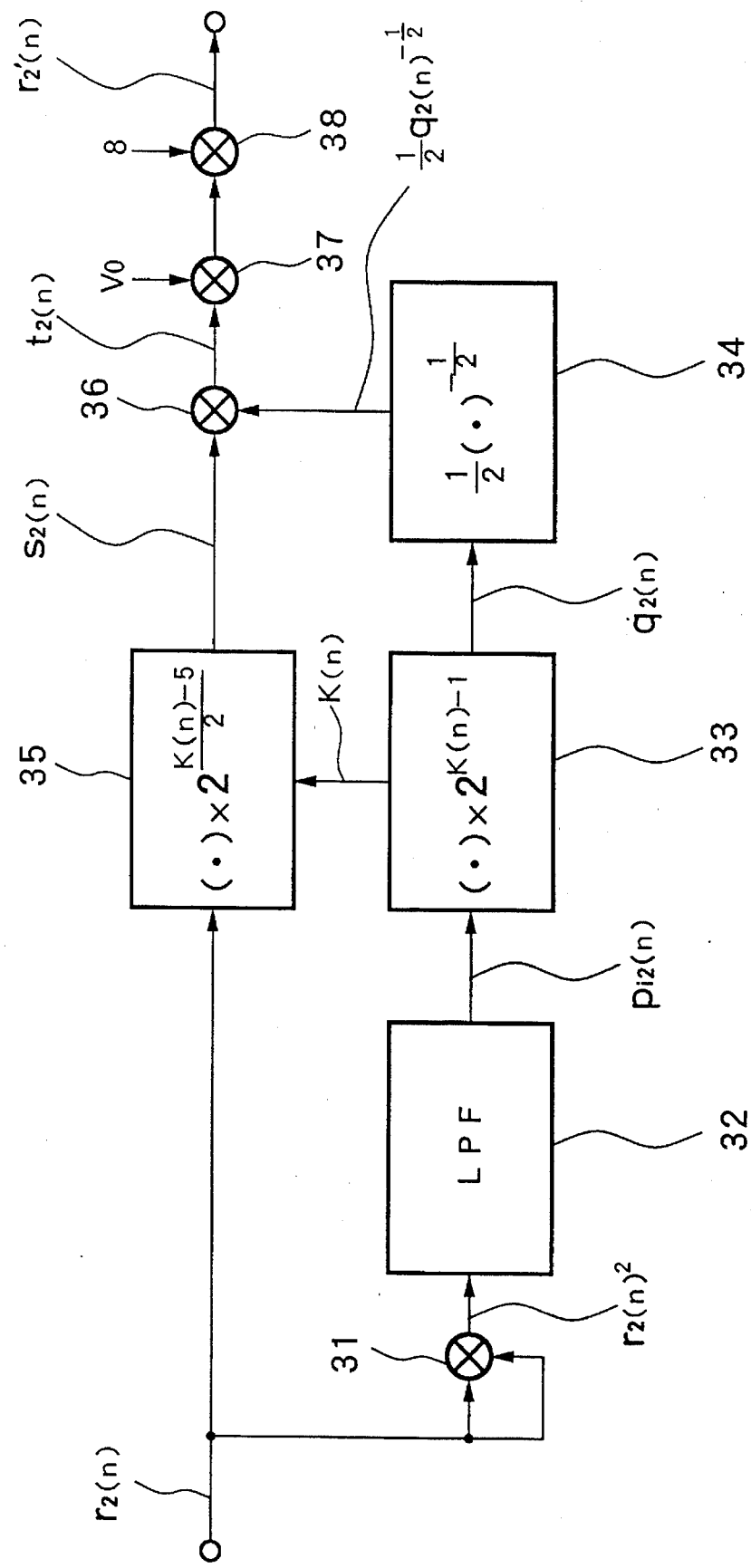
FIG. 5 is a diagram illustrating the structure of the digital automatic gain controller according to the second embodiment.

FIG. 5 illustrates the structure of the digital automatic gain controller (which is referred to as a "controller" thereinafter) according to the second embodiment. The controller shown in FIG. 5 is comprised of the multiplier 31, low pass filter (LPF) 32, multiplier 33 multiplying by $2^n$ operation apparatus 34 calculating $x^{-\tfrac{1}{2}}$ for $\tfrac{1}{2}\leq x<1$, multiplier 35 multiplying by the value in which the absolute value is larger than or equal to 1, multiplier 36 multiplying by the value in which the absolute value is less than 1, and constant multipliers 37 and 38. $V_0$ is a predetermined effective value.

Furthermore, $r_2(n)$, $r_2'(n)$, $s_2(n)$, $t_2(n)$, $P_{r2}(n)$, $q_2(n)$, and $K(n)$ are signal values at each portion of the controller at the sampling time n. Among those, $K(n)$ is an integer and the other values are decimals in which the absolute values are less than 1. The controller shown in FIG. 5 is comprised of the software of the fixed point DSP.

Figure 6:
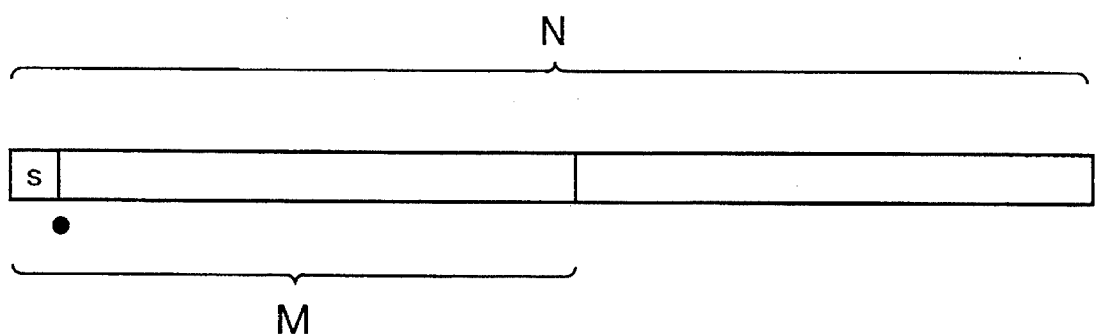
FIG. 6 is a diagram illustrating the fixed point format of the DSP which is used in the second embodiment.

FIG. 6 is a fixed point format of the DSP according to the present embodiment. In the diagram, the character S, black dot, and character N respectively represent a sign bit, decimal, and total bit. Furthermore, the character M represents the total bit of the input signal $r_2(n)$ and inputted into the upper M bit. However, $(M-1)\times 2\leq N-1$ needs to be satisfied.

In the controller shown in FIG. 5, the input signal $r_2(n)$ is squared by the multiplier 31 and averaged by the LPF 32. The mean power signal $P_{r2}$ can be obtained by:

$$P_{r2}(n)=E(r_2(n)^2) \qquad (28)$$

Then, in the multiplier 33, the mean power signal $P_{r2}$ is multiplied by $2^{K(n)-1}$ while the following is calculated:

$$K(n)=-[\log_2 P_{r2}(n)] \qquad (29)$$

In this way, the normalized power signal $q_2$ is obtained. However, [x] represents a maximum integer which is less than x. The multiplier 33 outputs $q_2(n)$ and $K(n)$ to the operation apparatus 34 and multiplier 35 respectively.

From the equation (29), $q_2(n)$ is obtained by:

$$\begin{aligned} q_2(n) &= p_{r2}(n)\times 2^{K(n)-1} & (30)\\ &= p_{r2}(n)\times 2^{\{-[\log_2 P_{r2}(n)]-1\}}\\ &= 2^{\log_2 P_{r2}(n)}\times 2^{\{-[\log_2 P_{r2}(n)]-1\}}\\ &= 2^{\{\log_2 P_{r2}(n)-[\log_2 P_{r2}(n)]-1\}} \end{aligned}$$

Since $$-1\leq \log_2 P_{r2}(n)-[\log_2 P_{r2}(n)]-1<0 \qquad (30\text{-}1)$$

the normalized power signal $q_2(n)$ satisfies the following:

$$2^{-1}\leq q_2(n)<1 \qquad (30\text{-}2)$$

In the operation apparatus 34, the gain correction signal $(\tfrac{1}{2})q_2(n)^{-\tfrac{1}{2}}$ is calculated. In the multiplier 35, the input signal $r_2(n)$ is amplified based on $K(n)$ which is inputted from the multiplier 33, and the amplification signal $s_2(n)$ is obtained by:

$$S_2(n)=r_2(n)\times 2^{(k(n)-5)/2} \qquad (31)$$

The amplification signal $S_2(n)$ is multiplied by the gain correction signal $(\tfrac{1}{2})q_2(n)^{-\tfrac{1}{2}}$ in the multiplier 36, and the value $t_2$ is obtained. By using the equations (30) and (31), the value $t_2(n)$ can be obtained by:

$$\begin{aligned} t_2(n) &= S_2(n)\times (1/2)\, q_2(n)^{-1/2} & (32)\\ &= S_2(n)\times (1/2)\, \{P_{r2}(n)\times 2^{K(n)-1}\}^{-1/2}\\ &= S_2(n)\times 2^{-1}\times \left(\frac{1}{\sqrt{P_{r2}(n)}}\right)\times 2^{(1-k(n))/2}\\ &= \{r_2(n)\times 2^{(k(n)-5)/2}\}\times \left(\frac{1}{\sqrt{P_{r2}(n)}}\right)\times 2^{(-1-k(n))/2}\\ &= \frac{1}{8}\times \frac{r_2(n)}{\sqrt{P_{r2}(n)}} \end{aligned}$$

Furthermore, $t_2(n)$ is multiplied by the predetermined effective value $V_0$ and 8 by the constant multipliers 37 and 38. The output signal $r_2'(n)$ is obtained by:

$$r_2'(n) = t_2(n) \times V_0 \times 8 \quad (33)$$
$$= \frac{1}{8} \times \frac{r_2(n)}{\sqrt{P_{i2}(n)}} \times 8V_0$$
$$= \frac{V_0(n)}{\sqrt{P_{i2}(n)}} \cdot r_2(n)$$

Therefore, the gain is:

$$V_0 / \sqrt{P_{i2}(n)} \quad (34)$$

By the way, in the case where the mean power signal $P_{i2}(n)$ is constant, the effective value of the output signal $r_2'(n)$ is given from the equations (28) and (33):

$$\sqrt{Er_2'(n)^2} = \sqrt{E\left\{\frac{V_0}{\sqrt{P_{i2}(n)}} \cdot r_2(n)\right\}^2} \quad (35)$$
$$= \sqrt{E \cdot \frac{V_0^2}{P_{i2}(n)} \cdot (r_2(n))^2}$$
$$= \sqrt{\frac{V_0^2}{P_{i2}(n)} \cdot P_{i2}(n)}$$
$$= V_0$$

Thus, the effective value of the output signal $r_2'(n)$ is equal to the predetermined effective value $V_0$.

Figure 7:
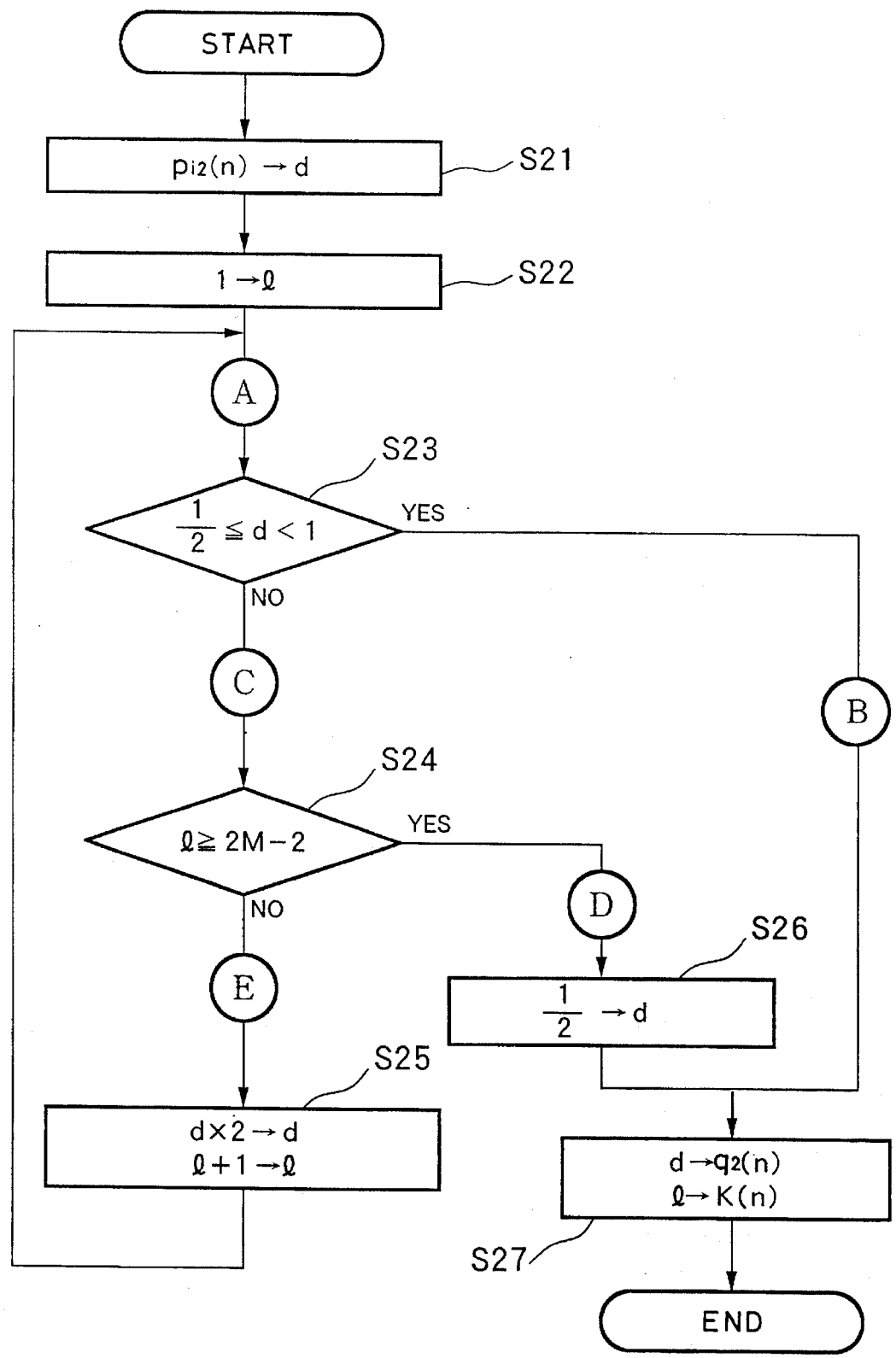
FIG. 7 is a flowchart illustrating the internal processing in the multiplier 33 according to the second embodiment.

Then, the internal processing in the multiplier 33 is described along with the flowchart in FIG. 7. In step S21, the mean power signal $P_{i2}(n)$ which is an input signal to the multiplier 33 is inputted into the register d of the DSP. Then, in step S22, the integer 1 is inputted to the register l.

In step S23, the process is branched off based on the value of the register d. In the case where ½≦d<1, the process proceeds to step S27. In other cases, the process proceeds to step S24 where the process is branched off based on the value in the register 1. The value in the register l is regarded as an integer, and if it is larger than 2M−2, the process proceeds to step S26. If not, the process proceeds to step S25.

In step S25, the value in the register d is doubled and the value of the register l is increased by 1 when the value of the register l is regarded as an integer. That is, the steps S23, S24, and S25 are repeated until ½≦d<1 or 1 ≧2M−2 is formed.

If the values of the register d and l in the processing at the j-th time to the processing in step S23 are determined as $d_j$ and $l_j$ respectively, it is apparent from the flowchart shown in FIG. 7 that $d_j$ is a geometrical progression in which the first term is $P_{i2}(n)$ and common ratio is 2. That is:

$$d_j = P_{i2}(n) \, 2^{j-1} \quad (j \geq 1) \quad (36)$$

Furthermore, $l_j$ is an arithmetical progression in which the first term is 1 and common difference is 1. That is:

$$l_j = 1 + (j-1) \times 1 = j \quad (j \geq 1) \quad (37)$$

From the above equations (36) and (37), the following equation is formed:

$$d_j = P_{i2}(n) \, 2^{l_j - 1} \quad (38)$$

That is, if the values d and l for the processing to step S23 are respectively determined as $d_A$ and $d_B$, the following relation is formed:

$$d_A = P_{i2}(n) \, 2^{l_A - 1} = 2^{\{log_2 P_{i2}(n) + l_A - 1\}} \quad (39)$$

When the processing gets out of the loop of steps S23–S25, there are two ways. One is that the processing passes through step S26 (passing through D in the flowchart) and the other is the process does not pass through step S26 (passing through B). If the values d and l when the processing is passing through A and B are determined as $d_B$ and $l_B$ respectively, since there is no difference between the value d passing A and the value l passing B, the following equation is formed as the equation (39):

$$d_B = P_{i2}(n) \, 2^{l_B - 1} = 2^{\{log_2 P_{i2}(n) + l_B - 1\}} \quad (40)$$

Furthermore, it is apparent from the flowchart that the following relation is formed:

$$\tfrac{1}{2} \leq d_B < 1 \quad (41)$$

Therefore, from the equation (40), the following relation is further formed:

$$1/2 \leq 2^{\{log_2 P_{i2}(n) + l_B - 1\}} < 1 \quad (42)$$
$$\therefore -1 \leq log_2 P_{i2}(n) + l_B - 1 < 0$$
$$\therefore -l_B \leq log_2 P_{i2}(n) < -(l_B - 1)$$

That is:

$$-1 \leq log_2 P_{i2}(n) + l_B - 1 < 0 \quad (42\text{-}1)$$
$$\therefore -l_B \leq log_2 P_{i2}(n) < -(l_B - 1) \quad (42\text{-}2)$$

Since $-l_B$ is a maximum integer which is less than $log_2 P_{i2}(n)$, it is expressed as the following:

$$-l_B = [log_2 P_{i2}(n)] \quad (43)$$

Therefore, from the equations (29) and (43), $l_B$ is obtained by:

$$l_B = -[log_2 P_{i2}(n)] = K(n) \quad (44)$$

Furthermore, if the equation (44) is substituted in the equation (40), the following equation can be obtained from the equation (30):

$$d_B = P_{i2}(n)^{K(n)-1} = q_2(n) \quad (45)$$

Therefore, the values d and l in the output B can be outputted as $q_2(n)$ and $K(n)$.

On the other hand, from the equation (42-2), the following relation is formed:

$$2^{-l_B} \leq P_{i2}(n) \quad (46)$$

At the same time, from the flowchart, the following relation is formed:

$$l_B \leq 2M - 2 \quad (47\text{-}1)$$
$$\therefore 2^{-l_B} \geq 2^{-2(M-1)} \quad (47\text{-}2)$$

Therefore, from the equations (46) and (47-2), in the case where the processing passes through B, the following relation is formed:

$$P_{r2}(n) \geq 2^{-2(M-1)} \quad (48\text{-}1)$$

That is:

$$Passing\ through\ B \rightarrow P_{r2}(n) \geq 2^{-2(M-1)} \quad (48\text{-}2)$$

The pair of this condition is:

$$P_{r2}(n) < 2^{-2(M-1)} \rightarrow Not\ passing\ through\ B \quad (48\text{-}3)$$

Furthermore, since it is obvious that the loop of steps S23–S25 is not an infinite loop, the processing always passes either the process B or D. Therefore, the following conditions (49) and (50) are formed:

$$Not\ passing\ through\ B \Leftrightarrow Passing\ through\ D \quad (49)$$

$$Not\ passing\ through\ D \Leftrightarrow Passing\ through\ B \quad (50)$$

Therefore, the following relation is formed:

$$P_{r2}(n) < 2^{-2(M-1)} \rightarrow Passing\ through\ D \quad (51)$$

By the way, in the case where $1 > 2M-2$ is formed when $\frac{1}{2} \leq d < 1$ has not formed yet in the loop, the process branches into D and gets out of this loop. If the values d and l at this time are respectively determined as $d_D$ and $l_D$, since $d_A = d_D$, $l_A = l_D$ according to the flowchart, the following relation is formed such as the equation (39):

$$d_D = P_{r2}(n)\ 2^{l_D-1} = 2^{\{log_2 P_{r2}(n) + l_D - 1\}} \quad (52)$$

Furthermore, from that in the case where the determination in step S23 is NO and the determination in step S24 is YES, the process branches into step S26, and that $d<1$ from the fixed point format, the following relations are formed:

$$d_D < \tfrac{1}{2} \quad (53)$$

$$l_D = 2M-2 \quad (54)$$

Therefore, from the equations (52), (53), and (54), in the case where the processing passes through D, the following relations are formed:

$$2^{\{log_2 P_{r2}(n) + 2M - 3\}} < \tfrac{1}{2} \quad (55)$$

$$P_{r2}(n) \times 2^{2M-3} < 2^{-1} \quad (55\text{-}1)$$

$$\therefore P_{r2}(n) < 2^{-2(M-1)} \quad (55\text{-}2)$$

That is:

$$Passing\ through\ D \rightarrow P_{r2}(n) < 2^{-2(M-1)} \quad (56)$$

If the pair of this condition is obtained and the equation (50) is used, the following relation is formed:

$$P_{r2}(n) \geq 2^{-2(M-1)} \Leftrightarrow Passing\ through\ B \quad (57)$$

At last, from the equations (48-2) and (57), the following condition is obtained:

$$P_{r2}(n) \geq 2^{-2(M-1)} \Leftrightarrow Passing\ through\ B \quad (58)$$

Furthermore, from the equations (51) and (56), the following condition is obtained:

$$P_{r2}(n) < 2^{-2(M-1)} \Leftrightarrow Passing\ through\ D \quad (59)$$

According to the equation (59), in the case where the processing passes D, the effective value of the input signal $r_2(n)$ satisfies the following:

$$\sqrt{P_{r2}(n)} < 2^{-(M-1)} \quad (60)$$

Since the input signal $r_2(n)$ is a decimal in M bit including a sign, in the case where the equation (60) is satisfied, the input signal is regarded as 0. At this time, if the definitions of the equations (29) and (30) are directed, K(n) becomes indefinite and $q_2(n)$ is not determined.

However, since the actual apparatus can express the only definite and determined values, in the case where the processing passes D, the following values are outputted:

$$q_2(n) = \tfrac{1}{2} \quad (61)$$

$$K(n) = 2M-2 \quad (62)$$

In the case where the processing passes D, since $1 = 2M-2$, ½ is inputted into the register d in step S26 and the process branches into step S27, the values $q_2(n)$ and K(n) which satisfy the equations (61) and (62) are outputted.

By the way, outputting the values $q_2(n)$ and K(n) corresponds to that the mean power $P_{r2}(n)$ of the input signal is regarded as the following from the equation (30):

$$P_{r2}(n) = q_2(n) \times 2^{-K(n)+1} = \tfrac{1}{2} \times 2^{-(2M-2)+1} = 2^{-2(M-1)} \quad (63)$$

As apparent from the equations (58) and (59), the value $P_{r2}(n) = 2^{-2(M-1)}$ is a border value between the case passing through B and the case passing through D.

That is, in the case where the processing passes D, the mean power $P_{r2}(n)$ of the input signal should be regarded as 0. However, in the actual apparatus, it is regarded that the minimum $P_{r2}(n)$ which can pass through B is inputted, and the values $q_2(n)$ and K(n) are outputted.

In this way, the definite and determined $q_2(n)$, K(n) can be outputted with respect to an arbitrary $P_{r2}(n)$.

Then, the detailed structure of the multiplier 35 is described.

Figure 8:
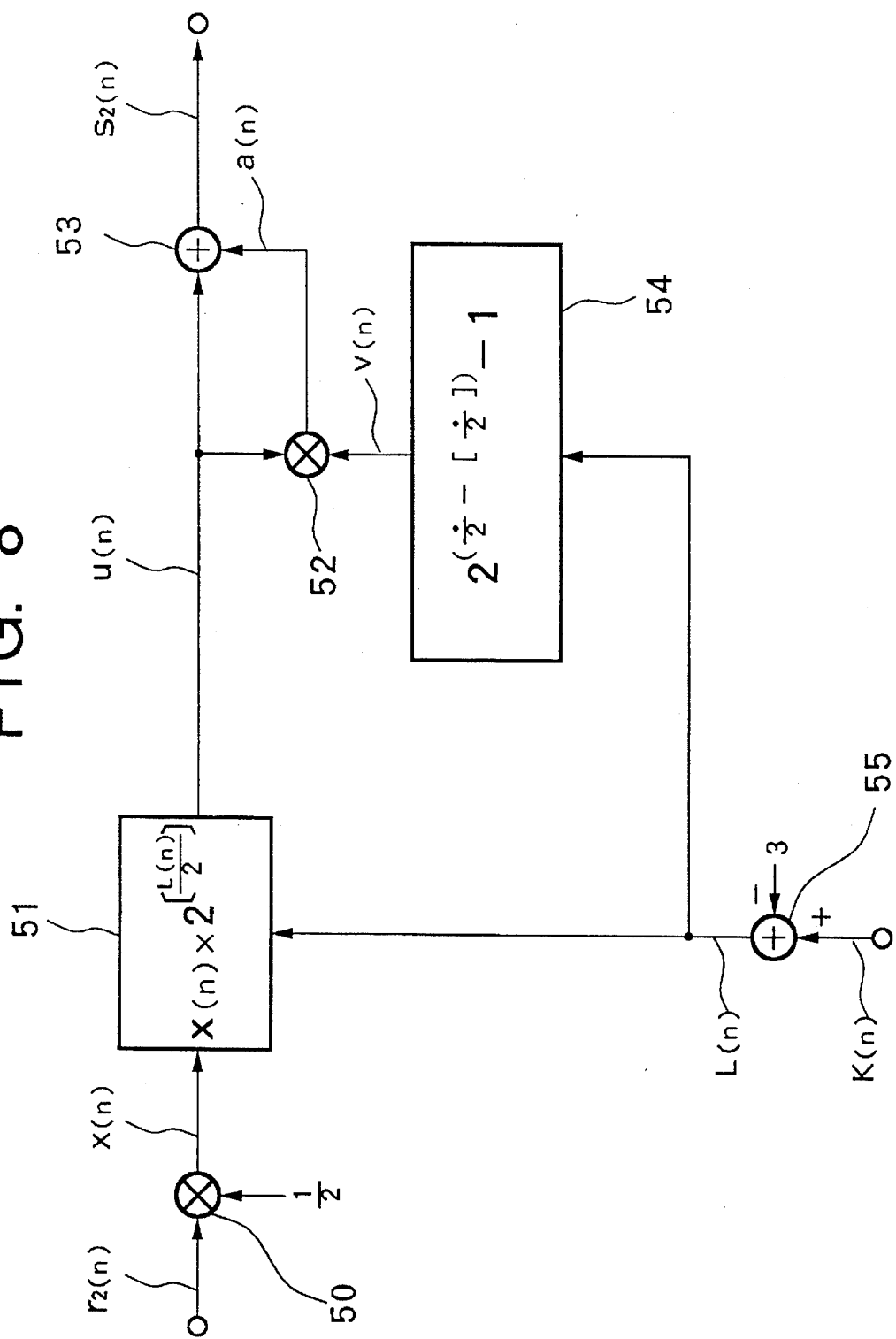
FIG. 8 is a block diagram illustrating the structure of the multiplier 35 according to the second embodiment.

FIG. 8 is a block diagram illustrating the structure of the multiplier 35. As shown in the diagram, the multiplier 35 is comprised of the constant multiplier 50, multiplier 51 multiplying by $2^n$, multiplier 52 multiplying by a number in which the absolute value is less than 1, adder 53, operation apparatus 54 calculating the fixed point value $2^{(L/2-[L/2])}-1$ for the inputted integer L, and constant subtracter 55. Furthermore, $r_2(n)$, x(n), $s_2(n)$, K(n), L(n), u(n), v(n), and a(n) are signal values at each portion of the multiplier at the sampling time n. Among those, the values except K(n) and L(n) are decimals in which the absolute values are less than 1. The present controller is also comprised of the fixed point DSP.

In FIG. 8, the input signal $r_2(n)$ is multiplied by ½ by the constant multiplier 50 and $x(n) = (½)r_2(n)$ is obtained. In the constant subtracter 55, L(n)=K(n)−3 is calculated based on the value K(n) which is inputted from the multiplier 33 shown in FIG. 5. Furthermore, x(n) is multiplied by $2^{[L(n)/2]}$ in the multiplier 51 by using L(n), and u(n) is obtained as the following:

$$u(n)=x(n)\times 2^{[L(n)/2]}=(1/2)r_2(n)\times 2^{[(K(n)-3)/2]} \qquad (64)$$

Furthermore, in the operation apparatus 54, the fixed point value v(n) is calculated from the integer L(n)=K(n)−3, and the value v(n) is:

$$v(n)=2^{((K(n)-3)/2-[(K(n)-3)/2])}-1 \qquad (65)$$

Furthermore, in the multiplier 52, u(n) is multiplied by v(n), and the value a (n) is obtained. Then, a (n) and u(n) are added, and the value $s_2(n)$ is obtained. That is, from the equations (64) and (65), the following equations are obtained:

$$\begin{aligned}
a(n) &= u(n) \times v(n) \qquad (66)\\
&= \{(1/2)r_2(n) \times 2^{[(K(n)-3)/2]}\} \times \\
&\quad \{2^{((K(n)-3)/2-[(K(n)-3)/2])} - 1\} \\
&= (1/2)r_2(n) \times \{2^{[(K(n)-3)/2]} - 2^{([(K(n)-3)/2])}\} \\
s_2(n) &= a(n) + u(n) \qquad (67)\\
&= (1/2)r_2(n) \times \{2^{[(K(n)-3)/2]} - \\
&\quad 2^{([(K(n)-3)/2])}\} + \\
&\quad (1/2)r_2(n) \times 2^{[(K(n)-3)/2]} \\
&= (1/2)r_2(n) \times 2^{[(K(n)-3)/2]} \\
&= r_2(n) \times 2^{[(K(n)-5)/2]}
\end{aligned}$$

Therefore, the multiplier 35 in FIG. 5 which has shown in FIG. 8 calculates $s_2(n)$ of the equation (31) from the values $r_2(n)$ and K(n).

Then, the internal processing in the operation apparatus 34 is described.

Figure 9:
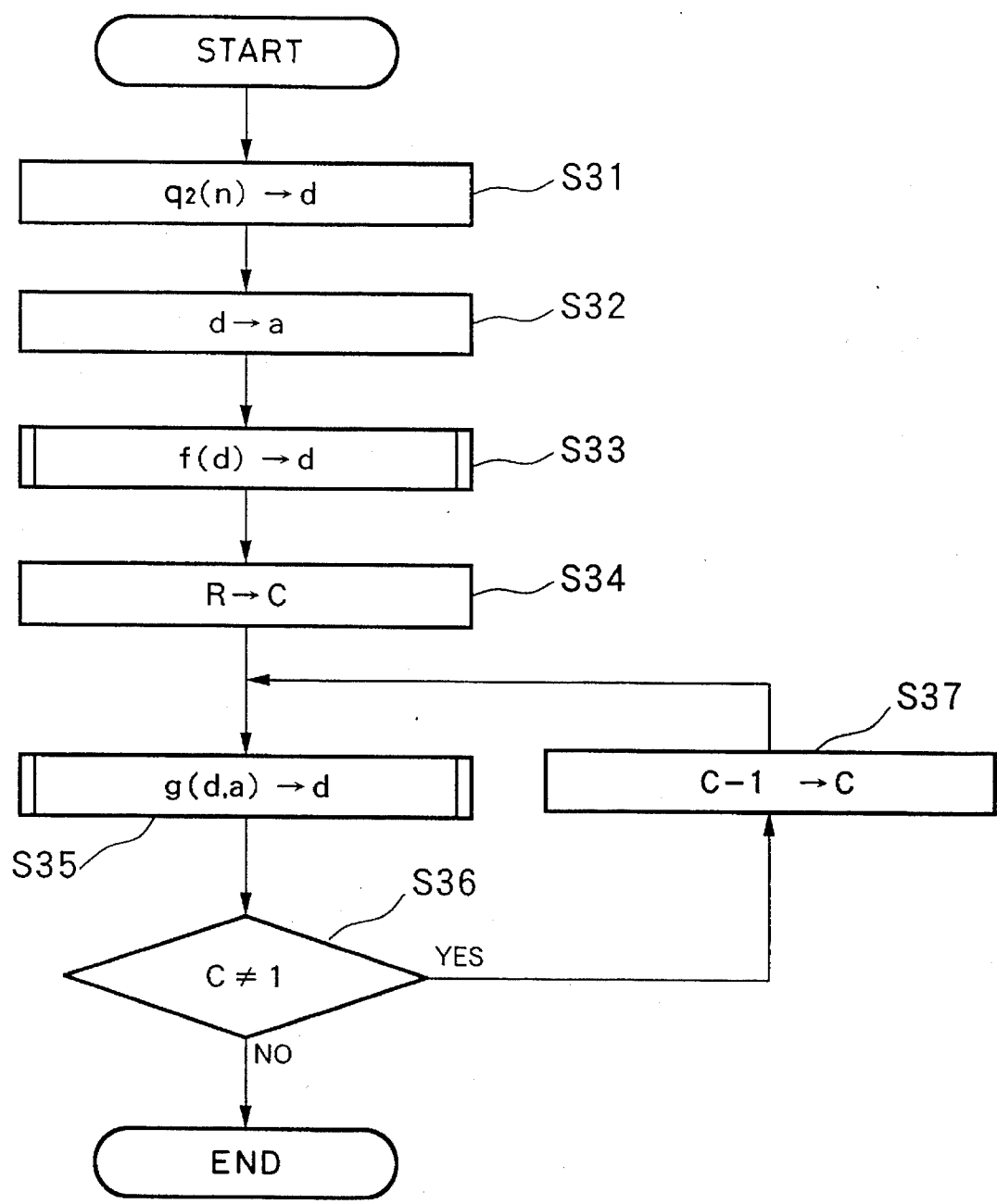
FIG. 9 is a flowchart illustrating the processing in the operation apparatus 34 according to the second embodiment.

FIG. 9 is a flowchart illustrating a detailed processing in the operation apparatus 34. In step S31, the input signal $q_2(n)$ to the operation apparatus 34 is inputted into the register d of the DSP. If the value in the register d at this time is determined as $d_1$, $d_1=q_2(n)$, and from the equation (30-2), the following relation is formed:

$$1/2 \leq d_1 < 1 \qquad (68)$$

In order to obtain $(1/2)d_1^{-1/2}$ for $d_1$ in this range, an approximate value of $(1/2)d_1^{-1/2}$ is calculated by the approximate polynomial. The obtained value is set to as an initial value and converged to a true value by the iterative method.

In step S32, $d=d_1$ is saved in the register a for the later processings. Then, in step S33, the approximate value $f(d_1)$ of $(1/2)d_1^{-1/2}$ is calculated by using the following polynomial:

$$f(x) \approx (1/2) x^{-1/2} \quad (1/2 \leq x \leq 1) \qquad (69)$$

The calculated value is inputted into the register d and the value in the register a needs to be kept.

If the value d at the completion of the processing in step S33 is determined as $d_3$, the value $d_3$ is:

$$d_3=f(d_1)\approx (1/2) d_1^{-1/2} \qquad (70)$$

From the view of the amount of operation, a desirable approximate polynomial used here is one in which the order is as low as possible having an efficient approximate precision. For this reason, a coefficient of the polynomial f(x) is determined so that f(x) becomes a Chebyshev approximation of $(1/2)x^{-1/2}$. As more particularly describing, a coefficient of the polynomial f(x) of p-th order is determined so as the following to be minimum:

$$\max|f(x)-(1/2)x^{-1/2}| \quad 1/2 \leq x \leq 2 \qquad (71)$$

In steps S34–S37, $d_3 \approx (1/2)d_1^{-1/2}$ is determined as an initial value and a true value of $(1/2)d_2^{-1/2}$ is calculated by the iterative method. That is, in step S34, a number of occurrence R is inputted into the repeat counter C, and in step S35, the value d is renewed by the two-variable function g(x, y). Again, the value a needs to be kept here.

Furthermore, the function g(x, y) is determined so that the series $\{X_n\}$ which is defined by the following recursion formula (72) is to be as the following equation (73):

$$\begin{aligned}
X &\approx (1/2)\alpha^{-1/2} \\
x_{n+1} &= g(x_n, \alpha) \quad (\alpha > 0, n = 0, 1, 2 \ldots)
\end{aligned} \qquad (72)$$

$$\lim_{n \to \infty} x_n = (1/2)\alpha^{-1/2} \qquad (73)$$

In steps S36 and S37, the processing is branched off based on the value of the repeat counter C. That is, the value of the register c is regarded as an integer. Then, if the value is not 1, the value of the repeat counter C is decreased by 1 and the process returns to step S35. Since when the processing enters to the loop, $a=d_1$, $d=d_3 \approx (1/2)d_1^{-1/2}$, if the value d is repeatedly renewed in step S35 (that is, g(d, a)→d), the value d approaches to $(1/2)a^{-1/2}=(1/2)d_2^{-1/2}$.

Since when the processing in step S35 is iterated for R times, C=1, the processing gets out of the aforementioned loop. The value d at this time is determined as $d_6$.

If the number of occurrence R is selected so that an error $|d_6-(1/2)d_1^{1/2}|$ at the completion of iteration is less than the numeric precision of the DSP, the value $d_6$ can be regarded as a true value of $(1/2)d_1^{-1/2}$. Therefore, the value $d_6$ of the register d at the completion of the processing in FIG. 9 is as the following:

$$d_6=(1/2)d_1^{-1/2}=(1/2) q_2(n)^{-1/2} \qquad (74)$$

Therefore, it is understood that the processing in the operation apparatus 34 in FIG. 5 is realized by the processing shown in the flowchart in FIG. 9.

Third Embodiment

The third embodiment according to the present invention is described.

Figure 10:
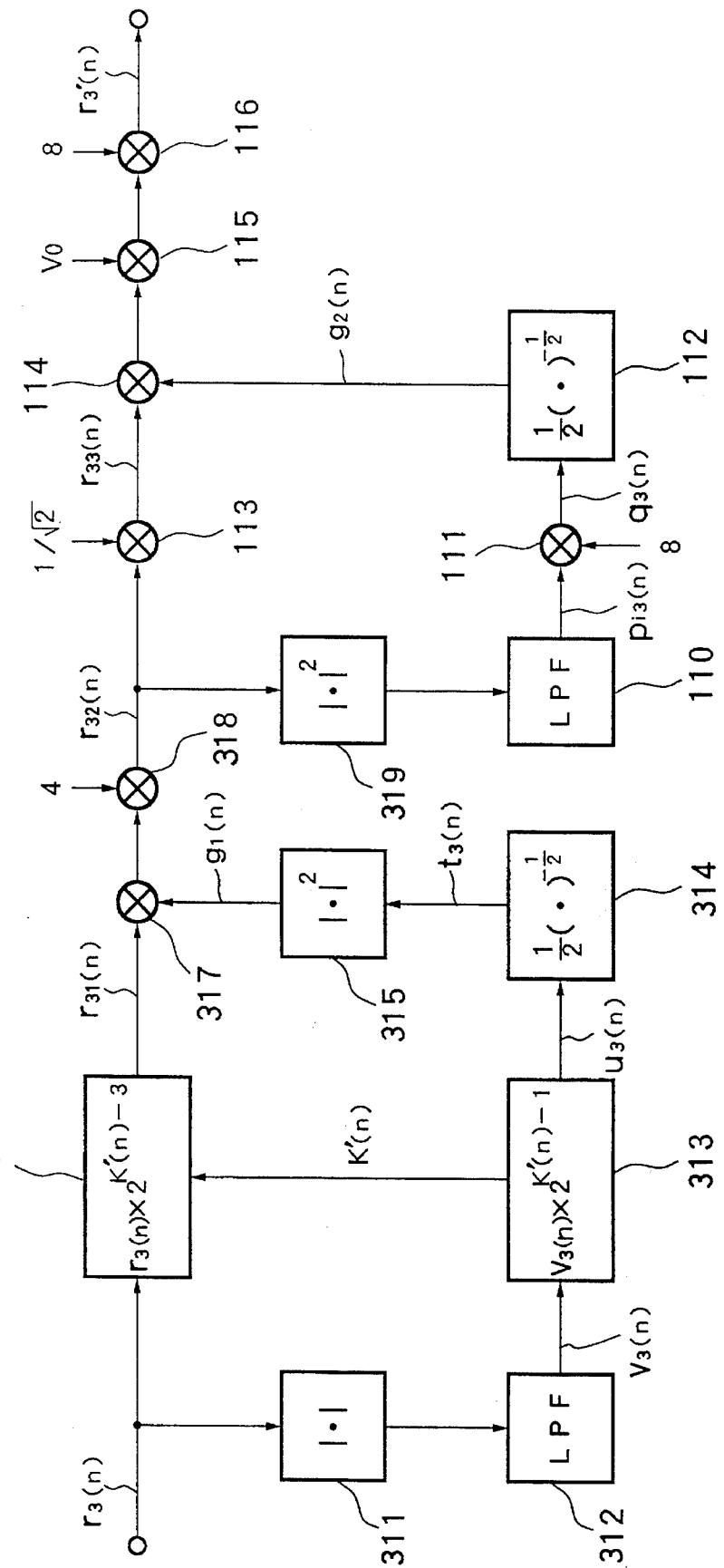
FIG. 10 is a block diagram illustrating the structure of the digital automatic controller according to the third embodiment of the present invention.

FIG. 10 is a block diagram illustrating the structure of a digital automatic gain controller (which is referred to as a "controller") according to the third embodiment of the present invention. The controller is comprised of the full-wave rectifier 311 which obtains an absolute value of a signal, low pass filters (LPFs) 312 and 110 which average a signal, operation apparatuses 112 and 314 which calculate $(1/2)x^{-1/2}$ for $1/2 \leq x \leq 1$, multipliers 315 and 319, multipliers 114 and 317, and constant multipliers 318, 111, 113, 115, and 116. $V_0$ is a predetermined effective value.

Figure 11:
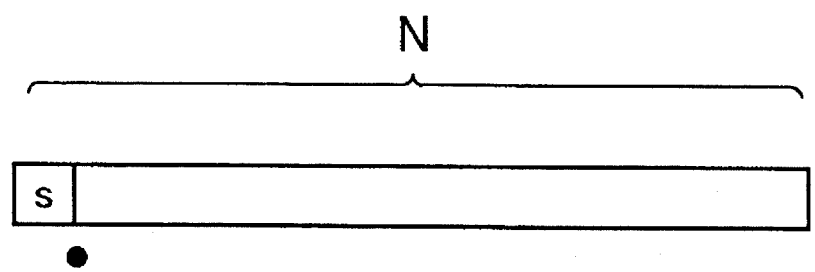
FIG. 11 is a diagram illustrating the fixed point format of the DSP according to the third embodiment.

Furthermore, $r_3(n)$, $r_{31}(n)$, $r_{32}(n)$, $r_{33}(n)$, $r_3'(n)$, $v_3(n)$, $u_3(n)$, $t_3(n)$, $g_1(n)$, K'(n), $P_{t3}(n)$, $q_3(n)$, and $g_2(n)$ are signal values at each portion of the controller at the sampling time n. Among those, K'(n) is an integer and the other values are decimals in which absolute values are less than 1. The processing in the present controller is comprised of the software of the fixed point DSP. FIG. 11 illustrates a fixed point format of the DSP. The "S", black dot, "N" respectively represent a sign bit, a decimal, and the total bit.

As shown in FIG. 10, the structure of the AGC in the present controller is that the two-stage feed forward type AGC is successively connected The first stage is a part to obtain the amplification signal $r_{32}(n)$ from the input signal $r_3(n)$. The second step is a part to obtain the amplification output signal $r_3'(n)$ from the amplification signal $r_{32}(n)$.

In the first stage AGC, the signal is roughly amplified, and in the second stage AGC, the signal is corrected so that the effective value of the output signal $r_3'(n)$ is to be the predetermined value $v_0$.

First of all, the absolute value of the input signal $r_3(n)$ is obtained by the full-wave rectifier 311 and averaged by the LPF 312. The mean amplification $v_3(n)$ of the input signal $r_3(n)$ is obtained as the following:

$$v_3(n) = E|r_3(n)| \tag{75}$$

Then, in the multiplier 313, the following equation is calculated:

$$K'(n) = -[\log_2 v_3(n)] \tag{76}$$

At the same time, the mean amplitude $v_3(n)$ is multiplied by $2^{K'(n)-1}$, and the normalized amplitude $u_3(n)$ is obtained. However, [x] represents a maximum integer which is less than x. The multiplier 313 outputs $u_3(n)$ and K'(n) to the operation apparatus 314 and multiplier 16 respectively.

From the above equation (76), $u_3(n)$ is obtained as the following:

$$\begin{aligned} u_3(n) &= v_3(n) \times 2^{K'(n)-1} \tag{77}\\ &= v_3(n) \times 2^{\{-[\log_2 v_3(n)]-1\}}\\ &= 2^{\log_2 v_3(n)} \times 2^{\{-[\log_2 v_3(n)]-1\}}\\ &= 2^{\{\log_2 v_3(n)-[\log_2 v_3(n)]-1\}} \end{aligned}$$

Then, the following relation is formed:

$$-1 \leq \log_2 v_3(n) - [\log_2 v_3(n)] - 1 < 0 \tag{78}$$

Therefore, the normalized amplitude $u_3(n)$ satisfies the following condition:

$$2^{-1} \leq u_3(n) < 1 \tag{79}$$

In the operation apparatus 314, the following equation is calculated:

$$t_3(n) = (1/2) u_3(n)^{-1/2} \tag{80}$$

Furthermore, $t_3(n)$ is squared by the multiplier 315 and the amplification gain $g_1(n)$ is obtained by:

$$\begin{aligned} g_1(n) &= t_3(n)^2 \tag{81}\\ &= \{(1/2) u_3(n)^{-1/2}\}^2\\ &= (1/4) u_3(n)^{-1} \end{aligned}$$

Furthermore, the value $r_{31}(n)$ is obtained in a manner such that the input signal $r_3$ is multiplied by $2^n$ in the multiplier 16 based on K'(n) which is inputted from the multiplier 313. That is:

$$r_{31}(n) = r_3(n) \times 2^{K'(n)-3} \tag{82}$$

If $r_{31}(n)$ is multiplied by the amplification gain $g_1(n)$ by the multiplier 317, and the product is then multiplied by 4, an amplification signal $r_{32}(n)$ can be obtained by using the equation (81) by:

$$\begin{aligned} r_{32}(n) &= r_{31}(n) \times g_1(n) \times 4 \tag{83}\\ &= r_{31}(n) \times \{(1/4) u_3(n)^{-1}\} \times 4\\ &= r_{31}(n)/u_3(n) \end{aligned}$$

That is, the equivalent divider is comprised of the combination of the operation apparatus 314, multiplier 315, multiplier 317, and constant multiplier 318.

If the equations (77) and (82) are substituted in the above equation (83), the following equation is obtained:

$$\begin{aligned} r_{32}(n) &= \{r_3(n) \times 2^{K'(n)-3}\}/\{v_3(n) \times 2^{K'(n)-1}\} \tag{84}\\ &= 2^{-2} \times r_3(n)/v_3(n)\\ &= \frac{1}{4} \cdot \frac{r_3(n)}{v_3(n)} \end{aligned}$$

If the mean amplitude $v_3(n)$ is a certain value, the effective value of the amplification signal $r_{32}(n)$ which is an output of the first stage AGC can be obtained from the equation (84):

$$\begin{aligned} \sqrt{Er_{32}(n)^2} &= \sqrt{E\left\{\frac{1}{4} \cdot \frac{r_3(n)}{v_3(n)}\right\}^2} \tag{85}\\ &= \sqrt{\frac{Er_3(n)^2}{(4v_3(n))^2}}\\ &= \frac{1}{4} \cdot \frac{\sqrt{Er_3(n)^2}}{v_3(n)} \end{aligned}$$

Suppose that the proportion of the effective value of the input signal $r_3(n)$ (a square-root of $Er_3(n)^2$) to the mean amplitude $v_3(n) = E|r_3(n)|$ of the value $r_3$ is as the following:

$$\alpha = \frac{\sqrt{Er_3(n)^2}}{v_3(n)} = \frac{\sqrt{Er_3(n)^2}}{E|r_3(n)|} \quad (1 \leq \alpha < (4/3)) \tag{86}$$

Then, the equation (85) becomes as the following:

$$\sqrt{Er_{32}(n)^2} = (1/4)\alpha \tag{87}$$

However, the range of α is the empirical value. That is, the first stage AGC is operated so that the effective value of the amplification signal $r_{32}(n)$ is one-fourth of the proportion of the effective value of the input signal $r_3(n)$ to the mean amplitude. Furthermore, from the equations (86) and (87), the following relation is formed:

$$1/4 \leq \sqrt{Er_{32}(n)^2} < 1/3 \tag{88}$$

Since the peak values of $r_3(n)$, $r_{31}(n)$, $r_{32}(n)$, $r_{33}(n)$, and $r_3'(n)$ are empirically known that they are smaller than the tripled effective values of $r_3(n)$, $r_{31}(n)$, $r_{32}(n)$, $r_{33}(n)$, and $r_3'(n)$, it is apparent that the following relation is formed:

$$(\text{Peak value of } r_{32}(n)) < 3\sqrt{Er_{32}(n)^2} < 1 \tag{89}$$

That is, the amplification signal $r_{32}(n)$ is amplified so as not to overflow in the fixed point format shown in FIG. 11.

The effective value of the output signal $r_{32}(n)$ of the first stage AGC is α/4 as indicated in the equation (87). In the second stage AGC, the effective value of the output signal $r_3'(n)$ is corrected to be the predetermined value $V_0$.

First, the amplification signal $r_{32}(n)$ is squared by the multiplier 319 and averaged by the LPF 110. The mean power $P_{i3}(n)$ of the amplification signal $r_{32}(n)$ can be obtained by:

$$P_{i3}(n) = Er_{32}(n)^2 \quad (90)$$

Then, the mean power $P_{i3}(n)$ is multiplied by 8 by the constant multiplier 111 and the normalized power $q_3$ is obtained. When the equations (87) and (90) are used, the the normalized power $q_3$ is obtained by:

$$\begin{aligned} q_3(n) &= 8P_{i3}(n) \\ &= 8Er_{32}(n)^2 = 8 \cdot \{(1/4)\alpha\}^2 \\ &= (1/2)\alpha^2 \end{aligned} \quad (91)$$

From the equation (86), the normalized power $q_3$ satisfies the following relation:

$$2^{-1} \leq q_3(n) < \tfrac{1}{2} \cdot (4/3)^2 = 8/9 < 1 \quad (92)$$

Then, the correction gain $g_2(n)$ is calculated by the operation apparatus 112 from the normalized power $q_3(n)$ as the following:

$$g_2(n) = (\tfrac{1}{2}) q_3(n)^{-\tfrac{1}{2}} \quad (93)$$

On the other hand, the amplification signal $r_{32}(n)$ is multiplied by $1/\sqrt{2}$ by the constant multiplier 113, and the value $r_{33}(n)$ is obtained. Furthermore, the value $r_{33}(n)$ is multiplied by the correction gain $g_2(n)$ by the multiplier 114, and further multiplied by the predetermined effective value $v_0$ and 8 by the constant multipliers 115 and 116 respectively. Then, the output signal $r_3'(n)$ is obtained by:

$$r_{33}(n) = r_{32}(n)/\sqrt{2} \quad (94)$$

$$r_3'(n) = r_{33}(n) \times g_2(n) \times v_0 \times 8 \quad (95)$$

When the equations (90), (91), (93), and (94) are used, $r_3'(n)$ is obtained by:

$$\begin{aligned} r_3'(n) &= r_{33}(n) \times \{(1/2)q_3(n)^{-1/2}\} \times v_0 \times 8 \\ &= r_{33}(n) \times \tfrac{1}{2} \cdot \frac{1}{\sqrt{8P_{i3}(n)}} \times v_0 \times 8 \\ &= \frac{r_{32}(n)}{\sqrt{P_{i3}(n)}} \times v_0 \\ &= \frac{r_{32}(n)}{\sqrt{Er_{32}(n)^2}} \times v_0 \end{aligned} \quad (96)$$

That is, the second stage AGC has the function that the amplification signal $r_{32}(n)$ is divided by the effective value (the square root of the mean power) and multiplied by the predetermined effective value.

If the effective value of the output signal $r_3'(n)$ of the second stage AGC is obtained, from the equation (96), the following is obtained:

$$\begin{aligned} \sqrt{Er_3'(n)^2} &= \sqrt{E\left\{\frac{r_{32}(n)}{\sqrt{Er_{32}(n)^2}} \times v_0\right\}^2} \\ &= \sqrt{\frac{v_0^2}{Er_{32}(n)^2} \times Er_{32}(n)^2} \\ &= v_0 \end{aligned} \quad (97)$$

It is obvious that the output signal $r_3'(n)$ is equal to the predetermined effective value $v_0$ from the above equation.

The internal signal processing in the multiplier 313 is described below along with FIG. 12. As shown in the diagram, the multiplier 313 is comprised of the constant subtracters 411, 421, 431, 441, the operation apparatuses 412, 413, 422, 423, 432, 433, 442, 443 which select an output value according to the sign of an inputted signal, the multipliers 414, 424, 434, 444, and the adder 425, 435, 445. Furthermore, $V_k(n)$ and $I_k(n)$ (k=1, 2, 3, 4) are signal values at each portion of the multiplier at the sampling time n. The value $V_k(n)$ is a decimal in which the absolute value is less than 1, and $I_k(n)$ is an integer. The case where the mean amplitude $v_3(n)$ which was inputted into the multiplier 13 satisfies the following condition is now to be described:

$$2^{-15} \leq v_3(n) < 1 \quad (98)$$

First, $2^{-8}$ is subtracted from the inputted mean amplitude $v_3(n)$ by the constant subtracter 411. The result of $v_3(n)-2^{-8}$ is outputted to the operation apparatuses 412 and 413. Then, in the operation apparatuses 412 and 413, the following equations are calculated based on the sign of the result of $v_3(n)-2^{-8}$:

$$I_1(n) = 8 \cdot \max(0, -sgn(v_3(n)-2^{-8})) \quad (99)$$

$$v_{31}(n)/v_3(n) = \max(1, -2^{-8} \cdot sgn(v_3(n)-2^{-8})) \quad (100)$$

The results are outputted to the multiplier 414 and adder 425. However, to an arbitrary real number, the following condition is satisfied:

$$sgn(x) = \begin{cases} +1 & (\text{when } x > 0) \\ 0 & (\text{when } x = 0) \\ -1 & (\text{when } x < 0) \end{cases} \quad (101)$$

It should be noted that $\max(x, y)$ represents the value x or y which is greater than the other. From the equation (100), the following is obtained:

$$v_{31}(n)/v_3(n) = \begin{cases} 2^8 & (\text{when } 2^{-15} \leq v_3(n) < 2^{-8}) \\ 1 & (\text{when } 2^{-8} \leq v_3(n) < 1) \end{cases} \quad (102)$$

The output $v_{31}(n)/v_3(n)$ of the operation apparatus 413 is multiplied by $v_3(n)$ by the multiplier 414, and the following is obtained:

$$v_{31}(n) = \begin{cases} 2^{-8} \cdot v_3(n) & (\text{when } 2^{-15} \leq v_3(n) < 2^{-8}) \\ v_3(n) & (\text{when } 2^{-8} \leq v_3(n) < 1) \end{cases} \quad (103)$$

It is obvious that $v_{31}(n)$ satisfies the following condition:

$$2^{-8} \leq v_{31}(n) < 1 \quad (104)$$

Furthermore, a logarithm of the both sides of the equation (102) is as the following:

$$\log_2 v_{31}(n) - \log_2 v_3(n) = \begin{cases} 8 & (\text{when } 2^{-15} \leq v_3(n) < 2^{-8}) \\ 0 & (\text{when } 2^{-8} \leq v_3(n) < 1) \end{cases} \quad (105)$$

$$= 8 \cdot max(0, -sgn(v_3(n) - 2^{-8}))$$

$$= I_1(n)$$

In the summary:

$$2^{-8} \leq v_{31}(n) < 1 \quad (106)$$

$$\log_2 v_{31}(n) - \log_2 v_3(n) = I_1(n) \quad (107)$$

Figure 12:
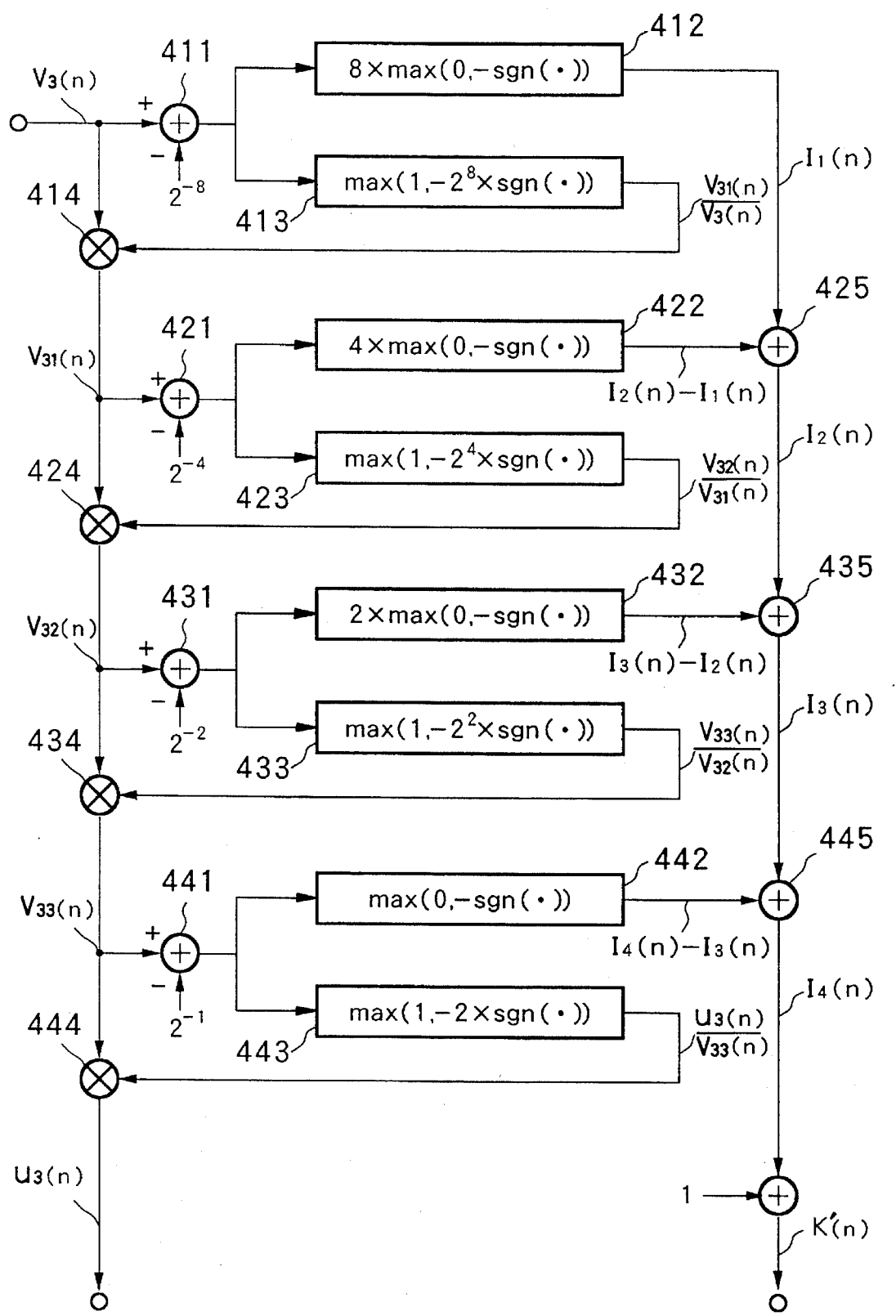
FIG. 12 is a diagram for explaining a signal processing inside of the multiplier 313 according to the third embodiment.
Figure 13:
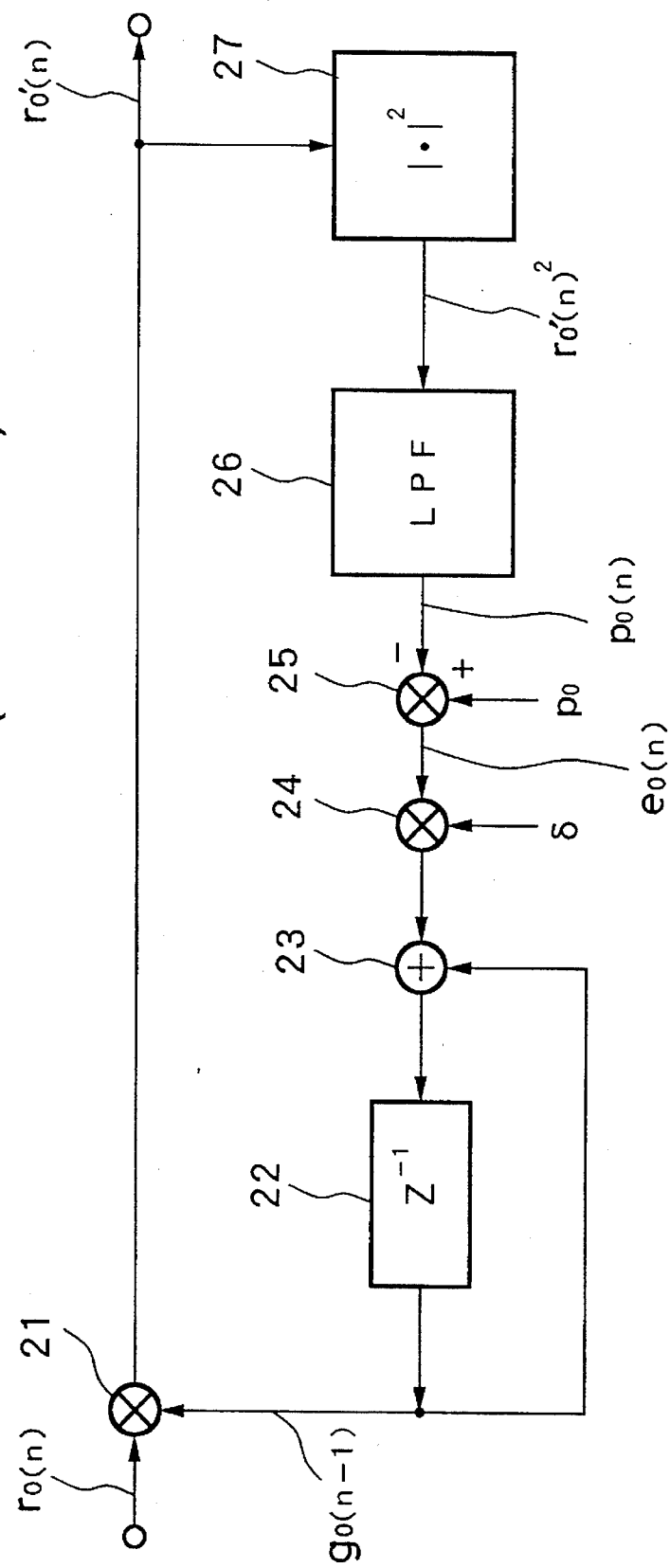
FIG. 13 is a block diagram illustrating the structure of the conventional feedback type digital AGC.

Similarly, from FIG. 12, the following relations are formed:

$$2^{-4} \leq v_{32}(n) < 1 \quad (108)$$

$$\log_2 v_{32}(n) - \log_2 v_{31}(n) = I_2(n) - I_1(n) \quad (109)$$

$$2^{-2} \leq v_{33}(n) < 1 \quad (110)$$

$$\log_2 v_{33}(n) - \log_2 v_{32}(n) = I_3(n) - I_2(n) \quad (111)$$

$$2^{-1} \leq u_3(n) < 1 \quad (112)$$

and $$\log_2 u_3(n) - \log_2 v_{33}(n) = I_4(n) - I_3(n) \quad (113)$$

If the terms of the equations (105), (109), (111), and (113) are respectively added in each side, the following is obtained:

$$\log_2 u_3(n) - \log_2 v_{33}(n) = I_4(n) \quad (114)$$

Finally, 1 is added to $I_4(n)$ by the adder 445 and K'(n) is obtained. If the equation (114) is used:

$$K'(n) = I_4(n) + 1 = \log_2 u_3(n) - \log_2 v_{33}(n) + 1 \therefore \log_2 v_{33}(n) = \log_2 u_3(n) - K'(n) + 1 \quad (115)$$

From the equation (112), the following relation is formed:

$$-1 \leq \log_2 u_3(n) < 0 \quad (116)$$

Therefore, the following relations are obtained:

$$-1 + (-K'(n) + 1) \leq \log_2 u_3(n) + (-K'(n) + 1) < -K'(n) + 1$$
$$\therefore -K'(n) \leq \log_2 u_3(n) - K'(n) + 1 < -K'(n) + 1 \quad (117)$$

If the equation (115) is substituted, the following is obtained:

$$-K'(n) \leq \log_2 v_3(n) < -K'(n) + 1 \quad (118)$$

That is, since $-K'(n)$ is a maximum integer which is not larger than $\log_2 v_3(n)$, it can be expressed as the following:

$$-K'(n) = [\log_2 v_3(n)] \quad (119)$$

Therefore, K'(n) and $v_3(n)$ in FIG. 12 satisfy the equation (76) which defines K'(n) and $v_3(n)$.

Furthermore, from the equation (115) the following relation is formed:

$$\log_2 u_3(n) = \log_2 v_3(n) + K'(n) - 1 \quad (120)$$

$$\therefore u_3(n) = 2^{\{\log_2 v_3(n) + K'(n) - 1\}}$$

$$= v_3(n) \times 2^{K'(n) - 1}$$

Therefore, it is indicated that $u_3(n)$ in FIG. 12 satisfies the equation (77).

As described above, $u_3(n)$ and K'(n) which are obtained in the signal processing apparatus shown in FIG. 12 satisfy the definition equations for $u_3(n)$ and K'(n) which are the outputs of the multiplier 13 in FIG. 10.

Furthermore, since the internal processing in the operation apparatuses 314 and 112 in the controller shown in FIG. 10 is the same as that in the operation apparatus 34 in the second embodiment shown in FIG. 5, the description is omitted here.

As described above, according to the third embodiment, in the digital automatic gain controller having the two-stage feed forward type AGC, it is corrected so that the effective value of the output signal is equaled to the predetermined value in the second stage AGC without using a feedback loop in a manner such that the effective value of the first stage AGC is amplified to be approximately ¼ of the original value in the first stage AGC when an equivalent division is performed in the both AGCs. In this way, the effective value of the output signal can be equaled to the predetermined value without using the feedback loop. Furthermore, in the contract to the the feedback type AGC, an optimal gain control at the current time can be performed in a manner such that a gain is successively corrected, not converged.

Therefore, principally, the initial response becomes quick and the gain can be converged before the PN segment regardless of the reception signal level.

Furthermore, in the third embodiment, the case where the input $v_3(n)$ to the multiplier 13 is over $2^{-15}$ has been described. However, more subtle signal can be processed in a manner such that the controller shown in FIG. 12 is developed in the same structure.

The present invention is not limited to the above described first to third embodiment. Various changes and modifications may be made in the invention without departing from the spirit and scope thereof. For example, in the internal processing in the operation apparatus, the order of the operations on the mantissa and exponent can be switched and the application using the register and memory can be also modified.

Furthermore, it goes without saying that the structure of the AGC is not comprised of the DSP, but of a general purpose microprocessor.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A digital gain controller comprising: operation means for calculating a mean power of an input signal;

first signal generation means for generating a normalized power signal by multiplying the mean power by $2^N$ (N is an integer), said normalized power signal having a value in the range of ½ to 1;

second signal generation means for generating a gain correction signal based on the normalized power signal;

third signal generation means for generating an amplification signal by multiplying the input signal by $2^{(N/2)-2}$ (N is an integer); and fourth signal generation means for generating an output signal by multiplying the amplification signal by both the gain correction signal and a predetermined constant.

2. A digital gain controller comprising:

operation means for calculating a mean amplitude of an input signal;

first gain controller for generating an amplification signal which is proportional to the input signal, said amplification signal having an effective value equal to one-fourth of the ratio of an effective value of the input signal to the mean amplitude; and second gain controller for generating an output signal which is proportional to the amplification signal, said output signal having an effective value which is equal to the predetermined effective value of said amplification signal;

wherein said first gain controller further comprises:

means for obtaining a normalized amplitude having the value in the range of ½ to 1 which is obtained by multiplying a mean amplitude by $2^N$ (N is an integer);

means for multiplying an input signal by $2^{N-2}$ (N is an integer); and means for equivalently dividing the input signal which was multiplied by $2^{N-2}$ by the normalized amplitude.

3. A gain control method comprising the steps of:

(a) calculating a mean power of an input signal;

(b) generating a normalized power signal having the value in the range of ½ to 1 by multiplying the mean power by $2^N$ (N is an integer);

(c) generating a gain correction signal based on said normalized power signal by multiplying the inverse square-root of the normalized power signal by ½;

(d) generating an amplification signal by multiplying the input signal by $2^{(N/2)-2}$ (N is an integer); and (e) generating an output signal by multiplying the amplification signal by the gain correction signal and a predetermined constant.

4. A digital gain controller comprising:

operation means for calculating a mean power of an input signal;

first signal generation means for generating a normalized power signal by multiplying the mean power by $2^N$ (N is an integer), said normalized power signal having a value in the range of ½ to 1;

second signal generation means for generating a gain correction signal based on the normalized power signal, said gain correction signal being equal to the inverse square root of the normalized power signal multiplied by ½;

third signal generation means for generating an amplification signal by multiplying the input signal by $2^{(N/2)-2}$ (N is an integer); and fourth signal generation means for generating an output signal by multiplying the amplification signal by both the gain correction signal and a predetermined constant.

5. A digital gain controller comprising:

operation means for calculating a mean amplitude of an input signal;

first gain controller for generating an amplification signal which is proportional to the input signal, said amplification signal having an effective value equal to one-fourth of the ratio of an effective value of the input signal to the mean amplitude; and second gain controller for generating an output signal which is proportional to the amplification signal, said output signal having an effective value which is equal to the predetermined effective value of said amplification signal;

wherein said second gain controller further comprises;

means for calculating a mean power of an amplification signal; and means for equivalently dividing the amplification signal by the inverse square-root of the mean power and multiplying by the predetermined effective value.

6. A gain controller comprising:

first converting means for converting a mean power of an input signal into a normalized power signal;

second converting means for converting the normalized power signal into a gain correction signal;

third converting means for converting the input signal into an amplification signal in accordance with a normalizing process performed by said first converting means; and fourth converting means for converting the amplification signal into a gain controlled output signal in accordance with the gain correction signal, wherein the normalized power signal has a value in the range which is determined by a converting process performed by said second converting means.

7. The controller according to claim 6, wherein the range which is determined by said second converting means is from ½ to 1.

8. The controller according to claim 6, wherein the amplification signal is proportional to a ratio between the mean power and the normalized power signal.

9. The controller according to claim 6, wherein the gain correction signal is proportional to an inverse square-root of the normalized power signal.

10. The controller according to claim 6, wherein said fourth converting means converts the amplification signal into the gain controlled output signal having a value equal to a predetermined effective value.

11. A gain control method comprising:

a first converting step of converting a mean power of an input signal into a normalized power signal;

a second converting step of converting the normalized power signal into a gain correction signal;

a third converting step of converting the input signal into an amplification signal in accordance with a normalizing process performed in said first converting step; and a fourth converting step of converting the amplification signal into a gain controlled output signal in accordance with the gain correction signal, wherein the normalized power signal having a value in a range which is determined by a converting process performed in said second converting step.

12. The method according to claim 11, wherein the range which is determined by the converting process performed in said second converting step is from ½ to 1.

13. The method according to claim 11, wherein the amplification signal is proportional to the input signal and a ratio between the mean power and the normalized power signal.

14. The method according to claim 11, wherein the gain correction signal is proportional to an inverse square-root of the normalized power signal.

15. The method according to claim 11, wherein in said fourth converting step, the amplification signal is converted into the gain controlled output signal having a value equal to a predetermined effective value.

16. A gain controller comprising:

a first gain controller for converting an input signal into an intermediate signal based on a mean amplitude of the input signal; and a second gain controller for converting the intermediate signal into a gain controlled output signal based on a mean power of the intermediate signal, wherein said first gain controller includes first converting means for converting the mean amplitude of the input signal into a normalized amplitude signal, second converting means for converting the normalized amplitude signal into a gain correction signal, third converting means for converting the input signal into amplification signal, and fourth converting means for converting the amplification signal into the intermediate signal in accordance with the gain correction signal.

17. The controller according to claim 16, wherein the normalized amplitude signal has a value in a range which is determined by a converting process performed by said second converting means.

18. The controller according to claim 17, wherein the range is from ½ to 1.

19. The controller according to claim 16, wherein said third converting means converts the input signal into the amplification signal in accordance with a converting process performed by said second converting means.

20. The controller according to claim 16, wherein the amplification signal is proportional to a ratio between the mean amplitude and the normalized amplitude signal.

21. The controller according to claim 16, wherein the gain correction signal is proportional to an inverse of the normalized amplitude signal.

22. The controller according to claim 16, wherein said second gain controller includes first power converting means for converting a mean power of the intermediate signal into a normalized power signal, second power converting means for converting the normalized power signal into a power gain correction signal, and amplitude converting means for converting the intermediate signal into the gain controlled output signal in accordance with the power gain control signal.

23. The controller according to claim 22, wherein the normalized power signal has a value in a range which is determined by a converting process performed by said second power converting means.

24. The controller according to claim 23, wherein the range is from ½ to 1.

25. The controller according to claim 22, wherein the power gain correction signal is proportional to an inverse square-root of the normalized power signal.

26. The controller according to claim 22, wherein said amplitude converting means converts the intermediate signal into a gain controlled output signal having a value equal to a predetermined effective value.

27. A gain control method comprising:

a first gain control step of converting an input signal into an intermediate signal based on a mean amplitude of the input signal; and a second gain control step of converting the intermediate signal into a gain controlled output signal based on a mean power of the intermediate signal, wherein said first gain control step includes a first converting step of converting the mean amplitude of the input signal into a normalized amplitude signal, a second converting step of converting the normalized amplitude signal into a gain correction signal, a third converting step of converting the input signal into amplification signal, and a fourth converting step of converting the amplification signal into the intermediate signal in accordance with the gain correction signal.

28. The method according to claim 27, wherein the normalized amplitude signal has a value in a range which is determined by a converting process performed in said second converting step.

29. The method according to claim 28, wherein the range is from ½ to 1.

30. The method according to claim 27, wherein in said third converting step, the input signal is converted into the amplification signal in accordance with a converting process performed in said second converting step.

31. The method according to claim 27, wherein the amplification signal is proportional to a ratio between the mean amplitude and the normalized amplitude signal.

32. The method according to claim 27, wherein the gain correction signal is proportional to an inverse of the normalized amplitude signal.

33. The method according to claim 27, wherein second gain control step includes a first power converting step of converting a mean power of the intermediate signal into a normalized power signal, a second power converting step of converting the normalized power signal into a power gain correction signal, and an amplitude converting step of converting the intermediate signal into the gain controlled output signal in accordance with the power gain control signal.

34. The method according to claim 33, wherein the normalized power signal has a value in a range which is determined by a converting process performed in said second power converting step.

35. The method according to claim 34, wherein the range is from ½ to 1.

36. The method according to claim 33, wherein the power gain correction signal is proportional to an inverse square-root of the normalized power signal.

37. The method according to claim 33, wherein in said amplitude converting step, the intermediate signal is converted into a gain controlled output signal having a value equal to a predetermined effective value.

38. A gain controller comprising:

a first gain controller for converting an input signal into an intermediate signal based on a mean amplitude of the input signal; and a second gain controller for converting the intermediate signal into a gain controlled output signal based on a mean power of the intermediate signal, wherein said second gain controller includes first power converting means for converting a mean power of the intermediate signal into a normalized power signal, second power converting means for converting the normalized power signal into a power gain correction signal, and amplitude converting means for converting the intermediate signal into the gain controlled output signal in accordance with the power gain correction signal.

39. The controller according to claim 38, wherein the normalized power signal has a value in a range which is determined by a converting process performed by said second power converting means.

40. The controller according to claim 39, wherein the range is from ½ to 1.

41. The controller according to claim 38, wherein the power gain correction signal is proportional to an inverse square-root of the normalized power signal.

42. The controller according to claim 38, wherein said amplitude converting means converts the intermediate signal into a gain controlled output signal having a value equal to a predetermined effective value.

43. A gain control method comprising:

a first gain control step of converting an input signal into an intermediate signal based on a mean amplitude of the input signal; and a second gain control step of converting the intermediate signal into a gain controlled output signal based on a mean power of the intermediate signal;

wherein said second gain control step includes a first power converting step of converting a mean power of the intermediate signal into a normalized power signal, a second power converting step of converting the normalized power signal into a power gain correction signal, and an amplitude converting step of converting the intermediate signal into the gain controlled output signal in accordance with the power gain control signal.

44. The method according to claim 43, wherein the normalized power signal has a value in a range which is determined by a converting process performed in said second power converting step.

45. The method according to claim 44, wherein the range is from ½ to 1.

46. The method according to claim 43, wherein the power gain correction signal is proportional to an inverse square-root of the normalized power signal.

47. The method according to claim 43, wherein in said amplitude converting step, the intermediate signal is converted into a gain controlled output signal having a value equal to a predetermined effective value.

* * * * *